United States Patent
Yamada et al.

(10) Patent No.: US 11,364,673 B2
(45) Date of Patent: *Jun. 21, 2022

(54) SYNTHETIC POLYMER FILM AND PRODUCTION METHOD OF SYNTHETIC POLYMER FILM

(71) Applicant: SHARP KABUSHIKI KAISHA, Sakai (JP)

(72) Inventors: Miho Yamada, Sakai (JP); Yasuhiro Shibai, Sakai (JP); Kiyoshi Minoura, Sakai (JP); Tokio Taguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 584 days.

This patent is subject to a terminal disclaimer.

(21) Appl. No.: 16/280,543

(22) Filed: Feb. 20, 2019

(65) Prior Publication Data

US 2019/0255759 A1    Aug. 22, 2019

(30) Foreign Application Priority Data

Feb. 21, 2018    (JP) .............................. JP2018-028456

(51) Int. Cl.
*B29C 59/00*    (2006.01)
*B29C 33/38*    (2006.01)
(Continued)

(52) U.S. Cl.
CPC ........ *B29C 59/007* (2013.01); *B29C 33/3857* (2013.01); *B29C 33/42* (2013.01);
(Continued)

(58) Field of Classification Search
CPC ... B29C 59/007; B29C 33/3857; B29C 33/56; B29C 59/16; B29C 33/42; B32B 3/26;
(Continued)

(56) References Cited

U.S. PATENT DOCUMENTS 9,781,924 B2    10/2017    Yamada et al.
9,781,925 B2    10/2017    Yamada et al.
(Continued)

FOREIGN PATENT DOCUMENTS

AU    20130903399    9/2013
CA    2323719 A1    4/2001
(Continued)

OTHER PUBLICATIONS

Co-Pending letter regarding related co-pending U.S. Appl. No. 14/771,833, filed Sep. 1, 2015 et al.
(Continued)

*Primary Examiner* — John E Uselding
(74) *Attorney, Agent, or Firm* — ScienBiziP, P.C.

(57) ABSTRACT

A synthetic polymer film whose surface has a plurality of raised or recessed portions, wherein a two-dimensional size of the plurality of raised or recessed portions is in a range of not less than 0.5 μm and not more than 3 μm when viewed in a normal direction of the synthetic polymer film, the synthetic polymer film has a crosslink structure and contains an organic carboxylic acid, at the lapse of 5 minutes since placing a 200 μL drop of water on the surface of the synthetic polymer film, a pH of an aqueous solution is less than 4, and an area equivalent circle diameter of the aqueous solution is not less than 20 mm, and at the lapse of 60 seconds since placing a drop of water on the surface of the synthetic polymer film, a static contact angle of the water drop with respect to the surface is less than 3°.

20 Claims, 10 Drawing Sheets

(51) Int. Cl.

| | |
|---|---|
| *C08K 5/5397* | (2006.01) |
| *C08L 71/02* | (2006.01) |
| *B29C 33/56* | (2006.01) |
| *B29C 59/16* | (2006.01) |
| *B29C 33/42* | (2006.01) |
| *B32B 3/26* | (2006.01) |

(52) U.S. Cl.
CPC .............. *B29C 33/56* (2013.01); *B29C 59/16* (2013.01); *B32B 3/26* (2013.01); *C08K 5/5397* (2013.01); *C08L 71/02* (2013.01); *C08L 2203/16* (2013.01); *C08L 2312/06* (2013.01)

(58) Field of Classification Search
CPC ... C08K 5/5397; C08L 71/02; C08L 2203/16; C08L 2312/06
See application file for complete search history.

(56) References Cited

U.S. PATENT DOCUMENTS

| | | | |
|---|---|---|---|
| 9,781,926 | B2 | 10/2017 | Yamada et al. |
| 10,136,638 | B2 | 11/2018 | Yamada et al. |
| 2003/0164326 | A1 | 9/2003 | Eberl et al. |
| 2003/0205475 | A1 | 11/2003 | Sawitowski |
| 2007/0159698 | A1 | 7/2007 | Taguchi et al. |
| 2008/0145390 | A1 | 6/2008 | Taylor et al. |
| 2009/0252825 | A1 | 10/2009 | Taguchi et al. |
| 2010/0009137 | A1 | 1/2010 | Kodama |
| 2010/0203161 | A1 | 8/2010 | Gehri et al. |
| 2010/0234323 | A1 | 9/2010 | Holzl et al. |
| 2011/0038910 | A1 | 2/2011 | Faucher et al. |
| 2011/0235181 | A1 | 9/2011 | Hayashibe et al. |
| 2011/0281068 | A1 | 11/2011 | David et al. |
| 2012/0218639 | A1 | 8/2012 | Minoura et al. |
| 2012/0318772 | A1 | 12/2012 | Minoura et al. |
| 2013/0057958 | A1 | 3/2013 | Minoura et al. |
| 2013/0344290 | A1 | 12/2013 | Yu et al. |
| 2014/0004304 | A1 | 1/2014 | Yu et al. |
| 2014/0077418 | A1 | 3/2014 | Otani et al. |
| 2014/0342121 | A1 | 11/2014 | Taguchi et al. |
| 2015/0140154 | A1 | 5/2015 | Isurugi et al. |
| 2015/0168610 | A1 | 6/2015 | Fukui et al. |
| 2015/0239022 | A1* | 8/2015 | Kobayashi ................. C08J 5/18 428/172 |
| 2015/0273755 | A1 | 10/2015 | Yee et al. |
| 2016/0113274 | A1 | 4/2016 | Yamada et al. |
| 2016/0212989 | A1 | 7/2016 | Juodkazis et al. |
| 2017/0258081 | A1 | 9/2017 | Yamada et al. |
| 2018/0036995 | A1 | 2/2018 | Okazaki et al. |
| 2018/0134859 | A1 | 5/2018 | Yamada et al. |

FOREIGN PATENT DOCUMENTS

| | | |
|---|---|---|
| CN | 201329050 Y | 10/2009 |
| CN | 103959106 A | 7/2014 |
| DE | 19950452 A1 | 4/2001 |
| JP | H08-024843 A | 1/1996 |
| JP | H08-300549 A | 11/1996 |
| JP | H11-010724 A | 1/1999 |
| JP | 2001-219464 A | 8/2001 |
| JP | 2001-310412 A | 11/2001 |
| JP | 2002-012257 A | 1/2002 |
| JP | 2005-055114 A | 3/2005 |
| JP | 2008-197217 A | 8/2008 |
| JP | 4265729 B | 5/2009 |
| JP | 2009-166502 A | 7/2009 |
| JP | 2010-000719 A | 1/2010 |
| JP | 2010-079200 A | 4/2010 |
| JP | 2012-078438 A | 4/2012 |
| JP | 2012-514239 A | 6/2012 |
| JP | 2012-208169 A | 10/2012 |
| JP | 2013-033287 A | 2/2013 |
| JP | 2013-078573 A | 5/2013 |
| JP | 2013-208817 A | 10/2013 |
| JP | 2014-005341 A | 1/2014 |
| JP | 2014-029391 A | 2/2014 |
| JP | 2014-066975 A | 4/2014 |
| JP | 2014-509967 A | 4/2014 |
| JP | 2014-511779 A | 5/2014 |
| JP | 2014-202955 A | 10/2014 |
| JP | 2015-024549 A | 2/2015 |
| JP | 2015-152659 A | 8/2015 |
| JP | 5788128 B1 | 9/2015 |
| JP | 2016-026546 A | 2/2016 |
| JP | 2016-093939 A | 5/2016 |
| JP | 2016-104545 A | 6/2016 |
| JP | 2016-210164 A | 12/2016 |
| JP | 2017-048132 A | 3/2017 |
| WO | 2007/097454 A1 | 8/2007 |
| WO | 2011/019834 A1 | 2/2011 |
| WO | 2011/052652 A1 | 5/2011 |
| WO | 2011/125486 A1 | 10/2011 |
| WO | 2011/148721 A1 | 12/2011 |
| WO | 2012/161315 A1 | 11/2012 |
| WO | 2013/183576 A1 | 12/2013 |
| WO | 2013/191092 A1 | 12/2013 |
| WO | 2014/021376 A1 | 2/2014 |
| WO | 2014/171365 A1 | 10/2014 |
| WO | 2015/163018 A1 | 10/2015 |
| WO | 2016/080245 A1 | 5/2016 |
| WO | 2016/084745 A1 | 6/2016 |
| WO | 2016/143778 A1 | 9/2016 |
| WO | 2016/175170 A1 | 11/2016 |
| WO | 2016/182444 A1 | 11/2016 |
| WO | 2016/208540 A1 | 12/2016 |
| WO | 2017/090661 A1 | 6/2017 |
| WO | 2017/168893 A1 | 10/2017 |
| WO | 2018/154843 A1 | 8/2018 |

OTHER PUBLICATIONS

Non-Final Rejection dated Nov. 24, 2017 for U.S. Appl. No. 14/897,252.

Non-Final Rejection dated Dec. 11, 2017 for U.S. Appl. No. 15/592,922.

Non-Final Office Action dated Jan. 24, 2018 for U.S. Appl. No. 15/126,078.

Espeel Pieter, et al. "One-pot, additive-free preparation of functionalized polyurethanes via amine-thiol-ene conjugation", Polymer Chemistry, 2013, 4(8):2449-2456.

Pogodin Sergey, et al. "Biophysical model of bacterial cell interactions with nanopatterned cicada wing surfaces", Biophysical Journal, 2013, 104(4):835-840.

Compound Summary for CID 3086063, Tecoflex from PubChem, accessed Jan. 17, 2018.

Final Office Action dated Apr. 13, 2018 for U.S. Appl. No. 14/897,252.
Final Office Action dated Jun. 14, 2018 for U.S. Appl. No. 15/592,922.
Non-Final Office Action dated Jul. 13, 2018 for U.S. Appl. No. 15/784,771.

Elena P. Ivanova, et al., "Bactericidal activity of black silicon", Nature Communications, Jun. 7, 2013, Article No. 2838 (2013), DOI: 10.1038/ncomms3838.

Alexander K. Epstein, et al., "Liquid-infused structured surfaces with exceptional anti-biofouling performance", Proc Natl Acad Sci USA. Aug. 14, 2012; 109(33): 13182-13187. doi: 10.1073/pnas. 1201973109.

Elena P. Ivanova, et al., Natural Bactericidal Surfaces: Mechanical Ruptureof Pseudomonas aeruginosa Cells by Cicada Wings,Small. Aug. 20, 2012;8(16):2489-94. doi: 10.1002/smll.201200528.

Chang Yao, Thomas J. Webster, Matthew Hedrick,"Decreased bacteria density on nanostructured polyurethane", J Biomed Mater Res Part A 2014:102A:1823-1828.

Cleaning Guide-How to Clean Surface,http://www.goodhousekeeping. com/home/cleaning/tips/a18875/how-to-clean, Sep. 7, 2011.

MIT's anti-microbial 'paint 'kills flu,bacteria, Anne Trafton, Nov. 30, 2006,http://chemistry.mit.edu/mlts-anti-microblal-paint-kills-flu-bacteria.

Rosa M. Raybaudi-Massilia et al. "Control of Pathogenic and Spoilage Microorganisms in Fresh-cut Fruits and Fruit Juices by

(56) References Cited

OTHER PUBLICATIONS

Traditional and Alternative Natural Antimicrobials", Comprehensive Reviews in Food Science and Food Safety, 2009, 8:157-180.
Jafar Hasan et al., "Antibacterial surfaces: the quest for a new generation of biomaterials", Trends in Biotechnology, vol. 31, Issue 5, May 2013, pp. 295-304.

* cited by examiner

5μm

5μm

5μm

5μm

10μm

5μm

1μm

1μm

1μm

1μm

10μm

SYNTHETIC POLYMER FILM AND PRODUCTION METHOD OF SYNTHETIC POLYMER FILM

BACKGROUND

1. Technical Field

The present invention relates to a synthetic polymer film whose surface has a microbicidal activity (including, for example, antifungal activity) and a production method of a synthetic polymer film.

2. Description of the Related Art

Recently, it was reported that surficial nanostructures of black silicon, wings of cicadas and dragonflies have a bactericidal activity (Ivanova, E. P. et al., "Bactericidal activity of black silicon", Nat. Commun. 4:2838 doi: 10.1038/ncomms3838 (2013)). Reportedly, the physical structure of the nanopillars that black silicon and wings of cicadas and dragonflies have produces a bactericidal activity.

According to Ivanova, E. P. et al., black silicon has the strongest bactericidal activity on Gram-negative bacteria, while wings of dragonflies have a weaker bactericidal activity, and wings of cicadas have a still weaker bactericidal activity. Black silicon has 500 nm tall nanopillars. Wings of cicadas and dragonflies have 240 nm tall nanopillars. The static contact angle (hereinafter, also simply referred to as "contact angle") of the black silicon surface with respect to water is 80°, while the contact angles of the surface of wings of dragonflies and cicadas with respect to water are 153° and 159°, respectively. It is estimated that black silicon is mainly made of silicon, and wings of dragonflies and cicadas are made of chitin. According to Ivanova, E. P. et al., the composition of the surface of black silicon is generally a silicon oxide, and the composition of the surface of wings of dragonflies and cicadas is generally a lipid.

SUMMARY

The mechanism of killing bacteria by nanopillars is not clear from the results described in Ivanova, E. P. et al. It is also not clear whether the reason why black silicon has a stronger bactericidal activity than wings of dragonflies and cicadas resides in the difference in height or shape of nanopillars, in the difference in surface free energy (which can be evaluated by the contact angle), in the materials that constitute nanopillars, or in the chemical properties of the surface.

The bactericidal activity of black silicon is difficult to utilize because black silicon is poor in mass productivity and is hard but brittle so that the shapability is poor.

One of the major objects of the present invention is to provide a synthetic polymer film whose surface has a microbicidal activity (including antifungal activity) and a production method of a synthetic polymer film.

A synthetic polymer film of an embodiment of the present invention is a synthetic polymer film whose surface has a plurality of raised or recessed portions, wherein a two-dimensional size of the plurality of raised or recessed portions is in a range of not less than 0.5 µm and not more than 3 µm when viewed in a normal direction of the synthetic polymer film, the synthetic polymer film has a crosslink structure and contains an organic carboxylic acid, at the lapse of 5 minutes since placing a 200 µL drop of water on the surface of the synthetic polymer film, a pH of an aqueous solution is less than 4, and an area equivalent circle diameter of the aqueous solution is not less than 20 mm, and at the lapse of 60 seconds since placing a drop of water on the surface of the synthetic polymer film, a static contact angle of the water drop with respect to the surface is less than 3°.

In one embodiment, the plurality of raised or recessed portions are arranged randomly.

In one embodiment, the synthetic polymer film does not have a flat portion between adjoining raised or recessed portions of the plurality of raised or recessed portions. The flat portion refers to a portion whose maximum height is less than 10 nm.

In one embodiment, when viewed in the normal direction of the synthetic polymer film, the two-dimensional size of the plurality of raised or recessed portions is in a range of not less than 0.5 µm and less than 1 µm.

In one embodiment, an amount of water required for dissolving 1 g of the organic carboxylic acid is equal to or greater than 1000 mL and less than 10000 mL. As for the solubility of the organic carboxylic acid in water, the amount of water required for dissolving 1 g of the organic carboxylic acid is preferably equal to or greater than 100 mL, more preferably equal to or greater than 200 mL, and is preferably less than 2000 mL.

In one embodiment, the organic carboxylic acid is 2,4,6-trimethylbenzoic acid.

In one embodiment, the synthetic polymer film is made of a photocurable resin, and the organic carboxylic acid is generated by photodecomposition of a photopolymerization initiator contained in the photocurable resin. The amount of the photopolymerization initiator with respect to the entirety of the photocurable resin composition is, for example, equal to or greater than 1 mass % and not more than 10 mass %.

In one embodiment, the photopolymerization initiator contains bis(2,4,6-trimethylbenzoyl)-phenylphosphine oxide.

In one embodiment, the photopolymerization initiator further contains diphenyl (2,4,6-trimethylbenzoyl) phosphine oxide.

In one embodiment, the crosslink structure contains an ethylene oxide unit.

A synthetic polymer film production method of an embodiment of the present invention is a production method of a synthetic polymer film, the synthetic polymer film having a plurality of raised or recessed portions at its surface, a two-dimensional size of the plurality of raised or recessed portions being not less than 0.5 µm and not more than 3 µm when viewed in a normal direction of the surface, the method including: providing a mold, the mold having a plurality of recessed or raised portions at its surface, a two-dimensional size of the plurality of recessed or raised portions being not less than 0.5 µm and not more than 3 µm when viewed in a normal direction of the surface; providing a work; and irradiating a photocurable resin applied between the mold and a surface of the work with light, thereby curing the photocurable resin.

In one embodiment, the mold includes an aluminum alloy layer at its surface, the aluminum alloy layer containing aluminum and titanium.

In one embodiment, a content of titanium in the aluminum alloy layer is not less than 0.01 mass % and not more than 1 mass %.

In one embodiment, a thickness of the aluminum alloy layer is not less than 1 µm and not more than 6 µm. When an inorganic underlayer is not provided under the aluminum alloy layer, the thickness of the aluminum alloy layer is, for example, not less than 4 μm and not more than 6 μm.

In one embodiment, the mold further includes an inorganic underlayer under the aluminum alloy layer.

In one embodiment, a thickness of the aluminum alloy layer is not less than 1 μm and less than 4 μm.

In one embodiment, the mold includes a high-purity aluminum layer at its surface, a purity of the high-purity aluminum layer is not less than 99.99 mass %.

In one embodiment, a thickness of the high-purity aluminum layer is not less than 1 μm and not more than 6 μm. When an inorganic underlayer is not provided under the high-purity aluminum layer, the thickness of the high-purity aluminum layer is, for example, not less than 2 μm and not more than 6 μm.

In one embodiment, the mold further includes an inorganic underlayer under the high-purity aluminum layer.

In one embodiment, a thickness of the high-purity aluminum layer is not less than 1 μm and less than 2 μm.

In one embodiment, the inorganic underlayer contains an aluminum-doped zinc oxide.

According to an embodiment of the present invention, a synthetic polymer film whose surface has a microbicidal activity (including antifungal activity) and a production method of a synthetic polymer film are provided.

DETAILED DESCRIPTION

Hereinafter, a synthetic polymer film whose surface has a microbicidal effect and a sterilization method with the use of the surface of the synthetic polymer film according to embodiments of the present invention are described with reference to the drawings.

In this specification, the following terms are used.

"Sterilization" (or "microbicidal") means reducing the number of proliferative microorganisms contained in an object, such as solid or liquid, or a limited space, by an effective number.

"Microorganism" includes viruses, bacteria, and fungi.

"Antimicrobial" generally includes suppressing and preventing multiplication of microorganisms and includes suppressing dinginess and slime which are attributed to microorganisms.

The present applicant conceived a method for producing an antireflection film (an antireflection surface) which has a moth-eye structure with the use of an anodized porous alumina layer. Using the anodized porous alumina layer enables manufacture of a mold which has an inverted moth-eye structure with high mass-productivity.

The present inventors developed the above-described technology and arrived at a synthetic polymer film whose surface has a microbicidal effect (see, for example, WO 2015/163018, WO 2016/080245 and WO 2016/208540). The entire disclosures of WO 2015/163018, WO 2016/080245 and WO 2016/208540 are incorporated by reference in this specification.

The configuration of a synthetic polymer film according to an embodiment of the present invention is described with reference to FIG. 1A and FIG. 1B.

Figure 1A:
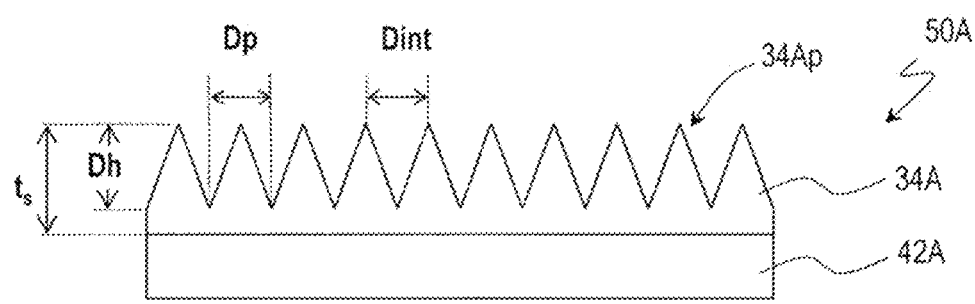
FIG. 1A and FIG. 1B are schematic cross-sectional views of synthetic polymer films 34A and 34B, respectively, according to embodiments of the present invention.
Figure 1B:
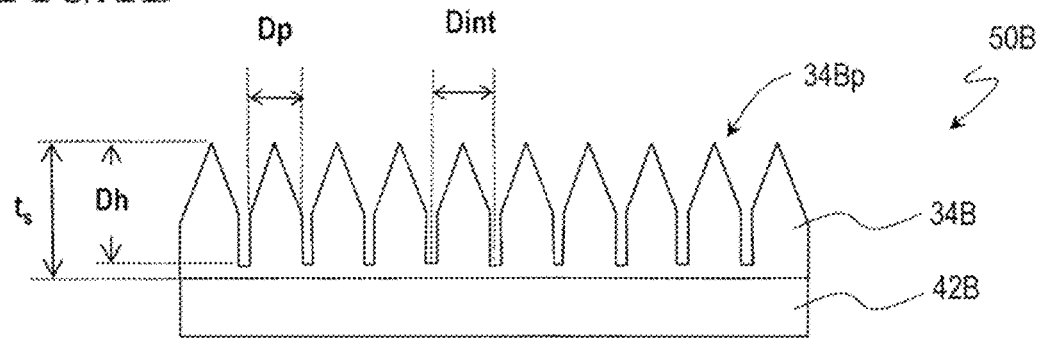

FIG. 1A and FIG. 1B respectively show schematic cross-sectional views of synthetic polymer films 34A and 34B according to embodiments of the present invention. The synthetic polymer films 34A and 34B described herein as examples are formed on base films 42A and 42B, respectively, although the present invention is not limited to these examples. The synthetic polymer films 34A and 34B can be directly formed on a surface of an arbitrary object.

A film 50A shown in FIG. 1A includes a base film 42A and a synthetic polymer film 34A provided on the base film 42A. The synthetic polymer film 34A has a plurality of raised portions 34Ap over its surface. The plurality of raised portions 34Ap constitute a moth-eye structure. When viewed in a normal direction of the synthetic polymer film 34A, the two-dimensional size of the raised portions 34Ap, $D_p$, is in the range of more than 20 nm and less than 500 nm. Here, the "two-dimensional size" of the raised portions 34Ap refers to the diameter of a circle equivalent to the area of the raised portions 34Ap when viewed in a normal direction of the surface. When the raised portions 34Ap have a conical shape, for example, the two-dimensional size of the raised portions 34Ap is equivalent to the diameter of the base of the cone. The typical adjoining distance of the raised portions 34Ap, $D_{int}$, is more than 20 nm and not more than 1000 nm. When the raised portions 34Ap are densely arranged so that there is no gap between adjoining raised portions 34Ap (e.g., the bases of the cones partially overlap each other) as shown in FIG. 1A, the two-dimensional size of the raised portions 34Ap, $D_p$, is equal to the adjoining distance $D_{int}$. The typical height of the raised portions 34Ap, $D_h$, is not less than 50 nm and less than 500 nm. As will be described later, a microbicidal activity is exhibited even when the height $D_h$ of the raised portions 34Ap is not more than 150 nm. The thickness of the synthetic polymer film 34A, $t_s$, is not particularly limited but only needs to be greater than the height $D_h$ of the raised portions 34Ap.

The synthetic polymer film 34A shown in FIG. 1A has the same moth-eye structure as the antireflection films disclosed in Japanese Patent No. 4265729, Japanese Laid-Open Patent Publication No. 2009-166502, WO 2011/125486 and WO 2013/183576. From the viewpoint of producing an antireflection function, it is preferred that the surface has no flat portion, and the raised portions 34Ap are densely arranged over the surface. Further, the raised portions 34Ap preferably has a such shape that the cross-sectional area (a cross section parallel to a plane which is orthogonal to an incoming light ray, e.g., a cross section parallel to the surface of the base film 42A) increases from the air side to the base film 42A side, e.g., a conical shape. From the viewpoint of suppressing interference of light, it is preferred that the raised portions 34Ap are arranged without regularity, preferably randomly. However, these features are unnecessary when only the microbicidal activity of the synthetic polymer film 34k is pursued. For example, the raised portions 34Ap do not need to be densely arranged. The raised portions 34Ap may be regularly arranged. Note that, however, the shape and arrangement of the raised portions 34Ap are preferably selected such that the raised portions 34Ap effectively act on microorganisms.

A film 50B shown in FIG. 1B includes a base film 42B and a synthetic polymer film 34B provided on the base film 42B. The synthetic polymer film 34B has a plurality of raised portions 34Bp over its surface. The plurality of raised portions 34Bp constitute a moth-eye structure. In the film 50B, the configuration of the raised portions 34Bp of the synthetic polymer film 34B is different from that of the raised portions 34Ap of the synthetic polymer film 34A of the film 50A. Descriptions of features which are common with those of the film 50A are sometimes omitted.

When viewed in a normal direction of the synthetic polymer film 34B, the two-dimensional size of the raised portions 34Bp, $D_p$, is in the range of more than 20 nm and less than 500 nm. The typical adjoining distance of the raised portions 34Bp, $D_{int}$, is more than 20 nm and not more than 1000 nm, and $D_p < D_{int}$ holds. That is, in the synthetic polymer film 34B, there is a flat portion between adjoining raised portions 34Bp. The raised portions 34Bp have the shape of a cylinder with a conical portion on the air side. The typical height of the raised portions 34Bp, $D_h$, is not less than 50 nm and less than 500 nm. The raised portions 34Bp may be arranged regularly or may be arranged irregularly. When the raised portions 34Bp are arranged regularly, $D_{int}$ also represents the period of the arrangement. This also applies to the synthetic polymer film 34A, as a matter of course.

In this specification, the "moth-eye structure" includes not only surficial nanostructures that have an excellent antireflection function and that are formed by raised portions which have such a shape that the cross-sectional area (a cross section parallel to the film surface) increases as do the raised portions 34Ap of the synthetic polymer film 34A shown in FIG. 1A but also surficial nanostructures that are formed by raised portions which have a part where the cross-sectional area (a cross section parallel to the film surface) is constant as do the raised portions 34Bp of the synthetic polymer film 34B shown in FIG. 1B. Note that, from the viewpoint of breaking the cell walls and/or cell membranes of microorganisms, providing a conical portion is preferred. Note that, however, the tip end of the conical shape does not necessarily need to be a surficial nanostructure but may have a rounded portion (about 60 nm) which is generally equal to the nanopillars which form surficial nanostructures of the wings of cicadas.

A mold for forming the moth-eye structure such as illustrated in FIG. 1A and FIG. 1B over the surface (hereinafter, referred to as "moth-eye mold") has an inverted moth-eye structure obtained by inverting the moth-eye structure. Using an anodized porous alumina layer which has the inverted moth-eye structure as a mold without any modification enables inexpensive production of the moth-eye structure. Particularly when a moth-eye mold in the shape of a hollow cylinder is used, the moth-eye structure can be efficiently manufactured according to a roll-to-roll method. Such a moth-eye mold can be manufactured according to methods disclosed in Japanese Laid-Open Patent Publication No. 2009-166502, WO 2011/125486 and WO 2013/183576.

A manufacturing method of a moth-eye mold 100A that is for production of the synthetic polymer film 34A is described with reference to FIG. 2A, FIG. 2B, FIG. 2C, FIG. 2D, and FIG. 2E.

Figure 2A:
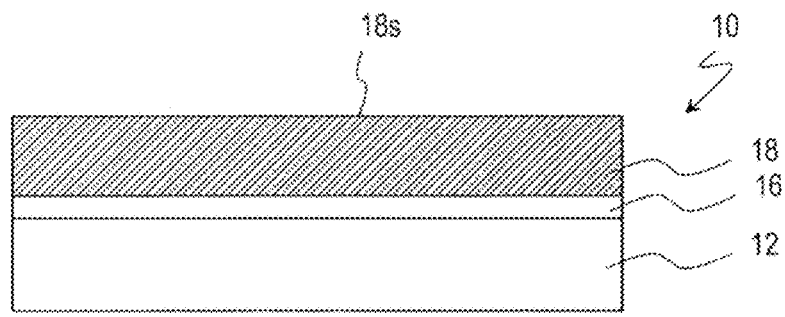
FIG. 2A, FIG. 2B, FIG. 2C, FIG. 2D, and FIG. 2E are diagrams for illustrating a method for manufacturing a moth-eye mold 100A and a configuration of the moth-eye mold 100A.

Firstly, a mold base 10 is provided which includes an aluminum base 12, an inorganic material layer 16 provided on a surface of the aluminum base 12, and an aluminum film 18 deposited on the inorganic material layer 16 as shown in FIG. 2A.

The aluminum base 12 used may be an aluminum base whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum film 18 and the aluminum base 12 in a portion in which the abrasive particles are present. Not only in the portion in which the abrasive particles are remaining but also in a portion which has a roughened surface, conduction is likely to occur locally between the aluminum film 18 and the aluminum base 12. When conduction occurs locally between the aluminum film 18 and the aluminum base 12, there is a probability that a local cell reaction will occur between an impurity in the aluminum base 12 and the aluminum film 18.

The material of the inorganic material layer 16 may be, for example, tantalum oxide ($Ta_2O_5$) or silicon dioxide ($SiO_2$). The inorganic material layer 16 can be formed by, for example, sputtering. When a tantalum oxide layer is used as the inorganic material layer 16, the thickness of the tantalum oxide layer is, for example, 200 nm.

The thickness of the inorganic material layer 16 is preferably not less than 100 nm and less than 500 nm. If the thickness of the inorganic material layer 16 is less than 100 nm, there is a probability that a defect (typically, a void; i.e., a gap between crystal grains) occurs in the aluminum film 18. If the thickness of the inorganic material layer 16 is not less than 500 nm, insulation is likely to occur between the aluminum base 12 and the aluminum film 18 due to the surface condition of the aluminum base 12. To realize anodization of the aluminum film 18 by supplying an electric current from the aluminum base 12 side to the aluminum film 18, the electric current needs to flow between the aluminum base 12 and the aluminum film 18. When employing a configuration where an electric current is supplied from the inside surface of the aluminum base 12 in the shape of a hollow cylinder, it is not necessary to provide an electrode to the aluminum film 18. Therefore, the aluminum film 18 can be anodized across the entire surface, while such a problem does not occur that supply of the electric current becomes more difficult as the anodization advances. Thus, the aluminum film 18 can be anodized uniformly across the entire surface.

To form a thick inorganic material layer 16, it is in general necessary to increase the film formation duration. When the film formation duration is increased, the surface temperature of the aluminum base 12 unnecessarily increases, and as a result, the film quality of the aluminum film 18 deteriorates, and a defect (typically, a void) occurs in some cases. When the thickness of the inorganic material layer 16 is less than 500 nm, occurrence of such a problem can be suppressed.

The aluminum film 18 is, for example, a film which is made of aluminum whose purity is not less than 99.99 mass % (hereinafter, also referred to as "high-purity aluminum film") as disclosed in WO 2011/125486. The aluminum film 18 is formed by, for example, vacuum evaporation or sputtering. The thickness of the aluminum film 18 is preferably in the range of not less than about 500 nm and not more than about 1500 nm. For example, the thickness of the aluminum film 18 is about 1 μm.

The aluminum film 18 may be an aluminum alloy film disclosed in WO 2013/183576 in substitution for the high-purity aluminum film. The aluminum alloy film disclosed in WO 2013/183576 contains aluminum, a metal element other than aluminum, and nitrogen. In this specification, the "aluminum film" includes not only the high-purity aluminum film but also the aluminum alloy film disclosed in WO 2013/183576.

Using the above-described aluminum alloy film can realize a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Figure 2B:
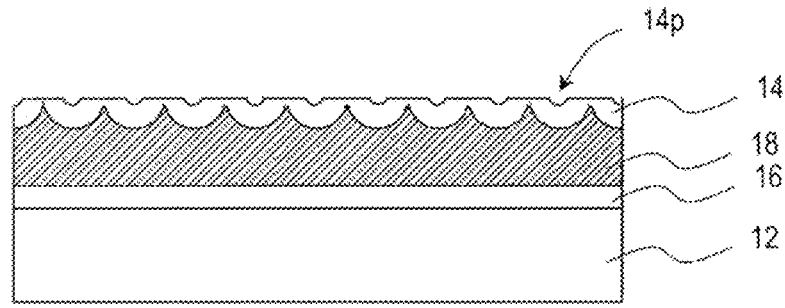

Then, a surface 18s of the aluminum film 18 is anodized to form a porous alumina layer 14 which has a plurality of recessed portions (micropores) 14p as shown in FIG. 2B. The porous alumina layer 14 includes a porous layer which has the recessed portions 14p and a barrier layer (the base of the recessed portions (micropores) 14p). As known in the art, the interval between adjacent recessed portions 14p (the distance between the centers) is approximately twice the thickness of the barrier layer and is approximately proportional to the voltage that is applied during the anodization. This relationship also applies to the final porous alumina layer 14 shown in FIG. 2E.

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum film 18 is anodized with an applied voltage of 80 V for 55 seconds using an oxalic acid aqueous solution (concentration: 0.3 mass %, solution temperature: 10° C.), whereby the porous alumina layer 14 is formed.

Figure 2C:
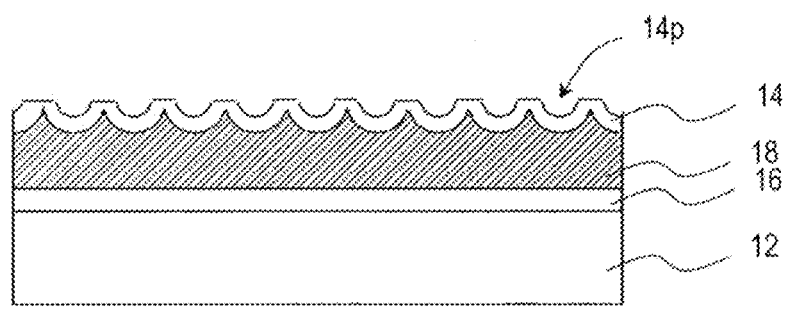

Then, the porous alumina layer 14 is brought into contact with an alumina etchant such that a predetermined amount is etched away, whereby the opening of the recessed portions 14p is enlarged as shown in FIG. 2C. By modifying the type and concentration of the etching solution and the etching duration, the etching amount (i.e., the size and depth of the recessed portions 14p) can be controlled. The etching solution used may be, for example, an aqueous solution of 10 mass % phosphoric acid, organic acid such as formic acid, acetic acid or citric acid, or sulfuric acid, or a chromic/phosphoric acid solution. For example, the etching is performed for 20 minutes using a phosphoric acid aqueous solution (10 mass %, 30° C.).

Figure 2D:
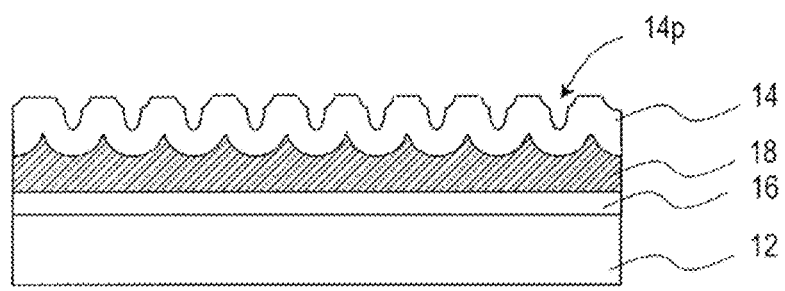

Then, the aluminum film 18 is again partially anodized such that the recessed portions 14p are grown in the depth direction and the thickness of the porous alumina layer 14 is increased as shown in FIG. 2D. Here, the growth of the recessed portions 14p starts at the bottoms of the previously-formed recessed portions 14p, and accordingly, the lateral surfaces of the recessed portions 14p have stepped shapes.

Thereafter, when necessary, the porous alumina layer 14 may be brought into contact with an alumina etchant to be further etched such that the pore diameter of the recessed portions 14p is further increased. The etching solution used in this step may preferably be the above-described etching solution. Practically, the same etching bath may be used.

Figure 2E:
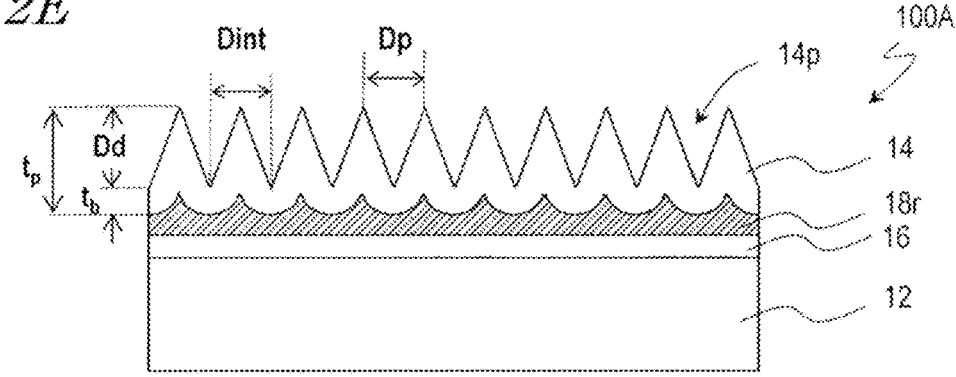

In this way, by alternately repeating the anodization step and the etching step as described above through multiple cycles (e.g., 5 cycles: including 5 anodization cycles and 4 etching cycles), the moth-eye mold 100A that includes the porous alumina layer 14 which has the inverted moth-eye structure is obtained as shown in FIG. 2E. Since the process is ended with the anodization step, the recessed portions 14p have pointed bottom portion. That is, the resultant mold enables formation of raised portions with pointed tip ends.

The porous alumina layer 14 (thickness: $t_p$) shown in FIG. 2E includes a porous layer (whose thickness is equivalent to the depth $D_d$ of the recessed portions 14p) and a barrier layer (thickness: $t_b$). Since the porous alumina layer 14 has a structure obtained by inverting the moth-eye structure of the synthetic polymer film 34A, corresponding parameters which define the dimensions may sometimes be designated by the same symbols.

The recessed portions 14p of the porous alumina layer 14 may have, for example, a conical shape and may have a stepped lateral surface. It is preferred that the two-dimensional size of the recessed portions 14p (the diameter of a circle equivalent to the area of the recessed portions 14p when viewed in a normal direction of the surface), $D_p$, is more than 20 nm and less than 500 nm, and the depth of the recessed portions 14p, $D_d$, is not less than 50 nm and less than 1000 nm (1 μm). It is also preferred that the bottom portion of the recessed portions 14p is acute (with the deepest part of the bottom portion being pointed). When the recessed portions 14p are in a densely packed arrangement, assuming that the shape of the recessed portions 14p when viewed in a normal direction of the porous alumina layer 14 is a circle, adjacent circles overlap each other, and a saddle portion is formed between adjacent ones of the recessed portions 14p. Note that, when the generally-conical recessed portions 14p adjoin one another so as to form saddle portions, the two-dimensional size of the recessed portions 14p, $D_p$, is equal to the adjoining distance $D_{int}$. The thickness of the porous alumina layer 14, $t_p$, is not more than about 1 μm.

Under the porous alumina layer 14 shown in FIG. 2E, there is an aluminum remnant layer 18r. The aluminum remnant layer 18r is part of the aluminum film 18 which has not been anodized. When necessary, the aluminum film 18 may be substantially thoroughly anodized such that the aluminum remnant layer 18r is not present. For example, when the inorganic material layer 16 has a small thickness, it is possible to readily supply an electric current from the aluminum base 12 side.

The manufacturing method of the moth-eye mold illustrated herein enables manufacture of a mold which is for production of antireflection films disclosed in Japanese Laid-Open Patent Publication No. 2009-166502, WO 2011/125486 and WO 2013/183576. Since an antireflection film used in a high-definition display panel is required to have high uniformity, selection of the material of the aluminum base, specular working of the aluminum base, and control of the purity and components of the aluminum film are preferably carried out as described above. However, the above-described mold manufacturing method can be simplified because the microbicidal activity can be achieved without high uniformity. For example, the surface of the aluminum base may be directly anodized. Even if, in this case, pits are formed due to impurities contained in the aluminum base, only local structural irregularities occur in the moth-eye structure of the finally-obtained synthetic polymer film 34A, and it is estimated that there is little adverse influence on the microbicidal activity.

According to the above-described mold manufacturing method, a mold in which the regularity of the arrangement of the recessed portions is low, and which is suitable to production of an antireflection film, can be manufactured. In the case of utilizing the microbicidal ability of the moth-eye structure, it is estimated that the regularity of the arrangement of the raised portions does not exert an influence. A mold for formation of a moth-eye structure which has regularly-arranged raised portions can be manufactured, for example, as described in the following section.

For example, after formation of a porous alumina layer having a thickness of about 10 μm, the formed porous alumina layer is removed by etching, and then, anodization may be performed under the conditions for formation of the above-described porous alumina layer. A 10 μm thick porous alumina layer is realized by extending the anodization duration. When such a relatively thick porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a chromic/phosphoric acid solution is preferred. Although continuing the etching for a long period of time sometimes causes galvanic corrosion, the chromic/phosphoric acid solution has the effect of suppressing galvanic corrosion.

A moth-eye mold for production of the synthetic polymer film 34B shown in FIG. 1B can be, basically, manufactured by combination of the above-described anodization step and etching step. A manufacturing method of a moth-eye mold 100B that is for production of the synthetic polymer film 34B is described with reference to FIG. 3A, FIG. 3B, and FIG. 3C.

Firstly, in the same way as illustrated with reference to FIG. 2A and FIG. 2B, the mold base 10 is provided, and the surface 18s of the aluminum film 18 is anodized, whereby a porous alumina layer 14 which has a plurality of recessed portions (micropores) 14p is formed.

Figure 3A:
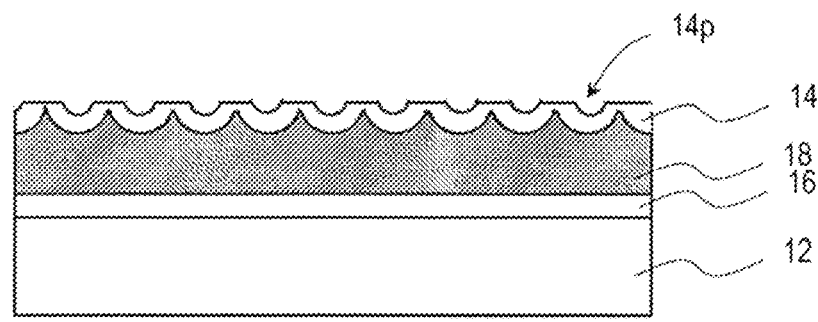
FIG. 3A, FIG. 3B, and FIG. 3C are diagrams for illustrating a method for manufacturing a moth-eye mold 100B and a configuration of the moth-eye mold 100B.

Then, the porous alumina layer 14 is brought into contact with an alumina etchant such that a predetermined amount is etched away, whereby the opening of the recessed portions 14p is enlarged as shown in FIG. 3A. In this step, the etched amount is smaller than in the etching step illustrated with reference to FIG. 2C. That is, the size of the opening of the recessed portions 14p is decreased. For example, the etching is performed for 10 minutes using a phosphoric acid aqueous solution (10 mass %, 30° C.).

Figure 3B:
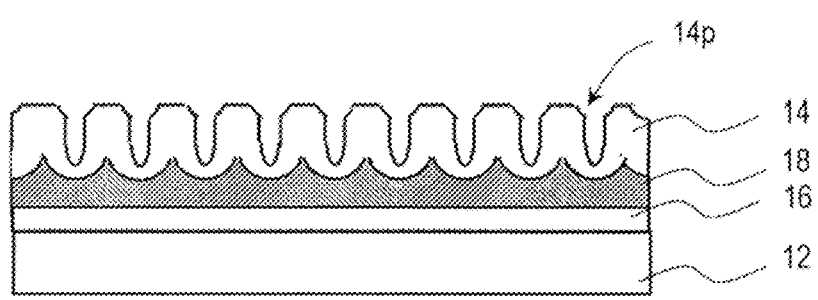

Then, the aluminum film 18 is again partially anodized such that the recessed portions 14p are grown in the depth direction and the thickness of the porous alumina layer 14 is increased as shown in FIG. 3B. In this step, the recessed portions 14p are grown deeper than in the anodization step illustrated with reference to FIG. 2D. For example, the anodization is carried out with an applied voltage of 80 V for 165 seconds (in FIG. 2D, 55 seconds) using an oxalic acid aqueous solution (concentration: 0.3 mass %, solution temperature: 10° C.).

Figure 3C:
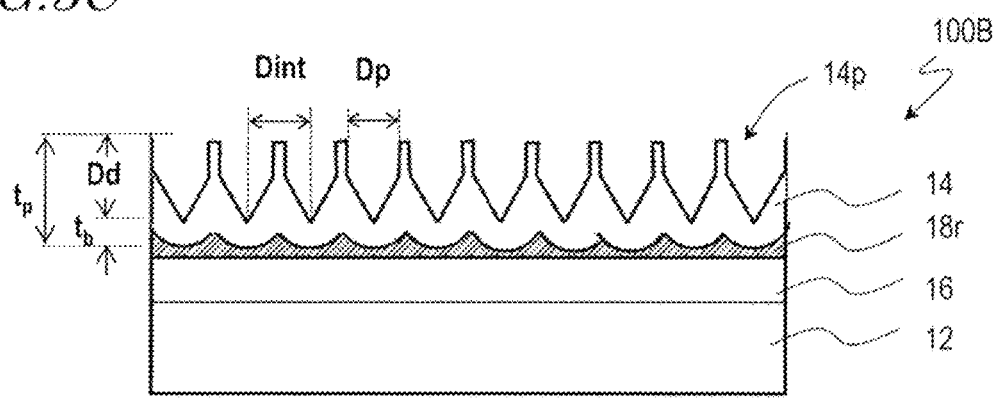

Thereafter, the etching step and the anodization step are alternately repeated through multiple cycles in the same way as illustrated with reference to FIG. 2E. For example, 3 cycles of the etching step and 3 cycles of the anodization step are alternately repeated, whereby the moth-eye mold 100B including the porous alumina layer 14 which has the inverted moth-eye structure is obtained as shown in FIG. 3C. In this step, the two-dimensional size of the recessed portions 14p, $D_p$, is smaller than the adjoining distance $D_{int}$ ($D_p < D_{int}$).

The size of the microorganisms varies depending on their types. For example, the size of *P. aeruginosa* is about 1 μm. However, the size of the bacteria ranges from several hundreds of nanometers to about five micrometers. The size of fungi is not less than several micrometers. For example, it is estimated that raised portions whose two-dimensional size is about 200 nm have a microbicidal activity on a microorganism whose size is not less than about 0.5 μm, but there is a probability that the raised portions are too large to exhibit a sufficient microbicidal activity on a bacterium whose size is several hundreds of nanometers. The size of viruses ranges from several tens of nanometers to several hundreds of nanometers, and many of them have a size of not more than 100 nm. Note that viruses do not have a cell membrane but have a protein shell called capsid which encloses virus nucleic acids. The viruses can be classified into those which have a membrane-like envelope outside the shell and those which do not have such an envelope. In the viruses which have an envelope, the envelope is mainly made of a lipid. Therefore, it is expected that the raised portions likewise act on the envelope. Examples of the viruses which have an envelope include influenza virus and Ebola virus. In the viruses which do not have an envelope, it is expected that the raised portions likewise act on this protein shell called capsid. When the raised portions include nitrogen element, the raised portions can have an increased affinity for a protein which is made of amino acids.

In view of the above, the configuration and production method of a synthetic polymer film having raised portions which can exhibit a microbicidal activity against a microorganism of not more than several hundreds of nanometers are described below.

In the following description, raised portions of the above-described synthetic polymer film which have a two-dimensional size in the range of more than 20 nm and less than 500 nm are referred to as "first raised portions". Raised portions which are superimposedly formed over the first raised portions are referred to as "second raised portions". The two-dimensional size of the second raised portions is smaller than the two-dimensional size of the first raised portions and does not exceed 100 nm. Note that when the two-dimensional size of the first raised portions is less than 100 nm, particularly less than 50 nm, it is not necessary to provide the second raised portions. Recessed portions of the mold corresponding to the first raised portions are referred to as "first recessed portions", and recessed portions of the mold corresponding to the second raised portions are referred to as "second recessed portions".

When the method of forming the first recessed portions which have predetermined size and shape by alternately performing the anodization step and the etching step as described above is applied without any modification, the second recessed portions cannot be formed successfully.

Figure 4A:
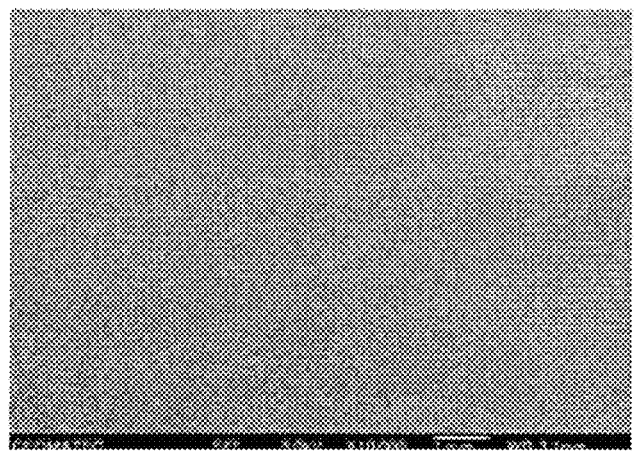
FIG. 4A shows a SEM image of a surface of an aluminum base.
Figure 4B:
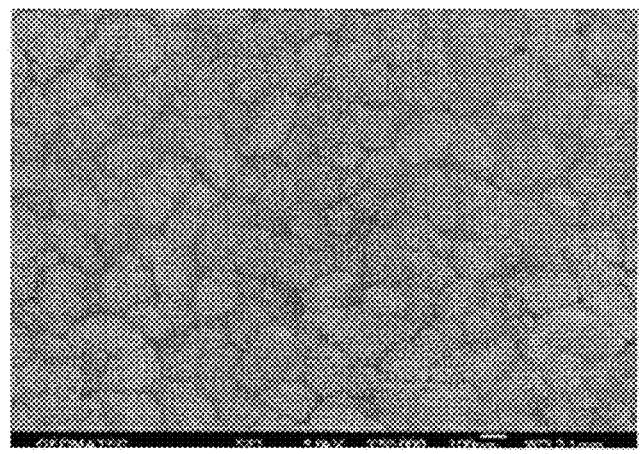
FIG. 4B shows a SEM image of a surface of an aluminum film.
Figure 4C:
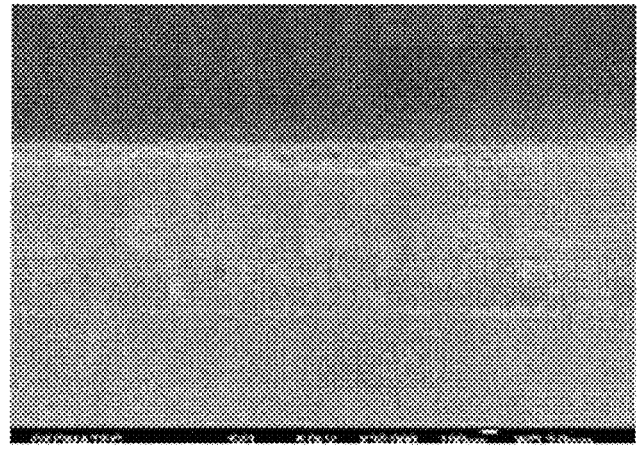
FIG. 4C shows a SEM image of a cross section of the aluminum film.

FIG. 4A shows a SEM image of a surface of an aluminum base (designated by reference numeral 12 in FIG. 2A). FIG. 4B shows a SEM image of a surface of an aluminum film (designated by reference numeral 18 in FIG. 2A). FIG. 4C shows a SEM image of a cross section of the aluminum film (designated by reference numeral 18 in FIG. 2A). As seen from these SEM images, there are grains (crystal grains) at the surface of the aluminum base and the surface of the aluminum film. The grains of the aluminum film form unevenness at the surface of the aluminum film. This unevenness at the surface affects formation of the recessed portions in the anodization and therefore interrupts formation of second recessed portions whose $D_p$ or $D_{int}$ is smaller than 100 nm.

In view of the above, a method for manufacturing a mold which is used in production of a synthetic polymer film according to an embodiment of the present invention includes: (a) providing an aluminum base or an aluminum film deposited on a support; (b) the anodization step of applying a voltage at the first level while a surface of the aluminum base or aluminum film is kept in contact with an electrolytic solution, thereby forming a porous alumina layer which has the first recessed portions; (c) after step (b), the etching step of bringing the porous alumina layer into contact with an etching solution, thereby enlarging the first recessed portions; and (d) after step (c), applying a voltage at the second level that is lower than the first level while the porous alumina layer is kept in contact with an electrolytic solution, thereby forming the second recessed portions in the first recessed portions. For example, the first level is higher than 40 V, and the second level is equal to or lower than 20 V.

Specifically, an anodization step is carried out with the voltage at the first level, whereby the first recessed portions are formed which have such a size that is not influenced by the grains of the aluminum base or aluminum film. Thereafter, the thickness of the barrier layer is decreased by etching, and then, another anodization step is carried out with the voltage at the second level that is lower than the first level, whereby the second recessed portions are formed in the first recessed portions. When the second recessed portions are formed through such a procedure, the influence of the grains is avoided.

Figure 5A:
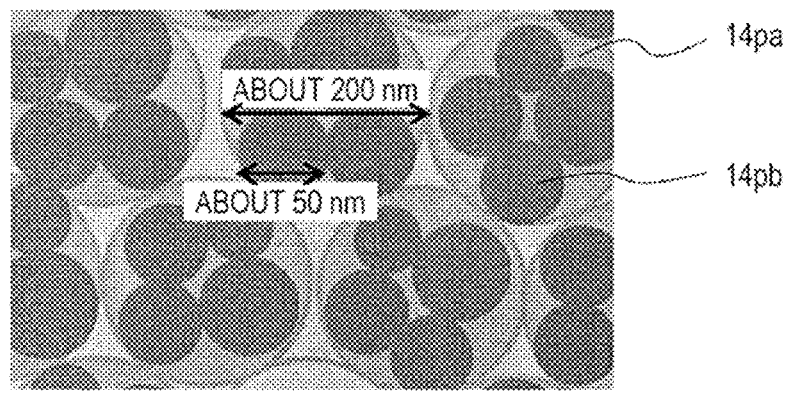
FIG. 5A is a schematic plan view of a porous alumina layer of a mold.
Figure 5B:
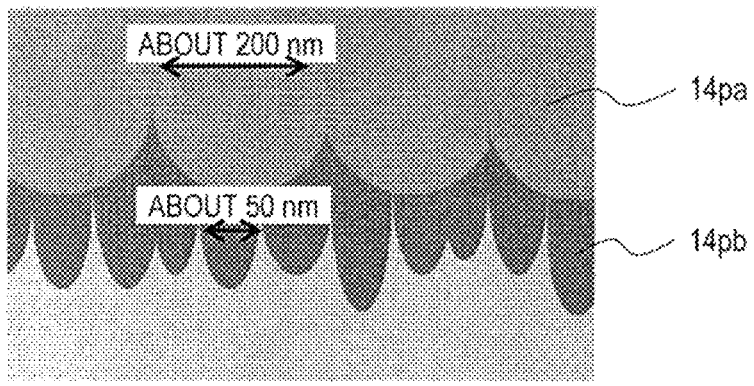
FIG. 5B is a schematic cross-sectional view of the porous alumina layer.
Figure 5C:
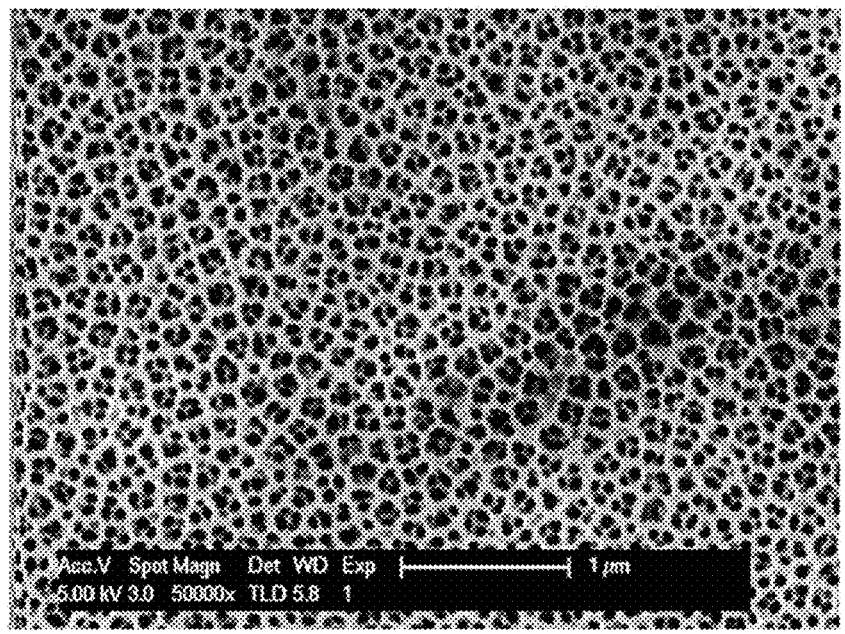
FIG. 5C is a SEM image of a prototype mold.

A mold which has first recessed portions 14pa and second recessed portions 14pb formed in the first recessed portions 14pa is described with reference to FIG. 5A, FIG. 5B, and FIG. 5C. FIG. 5A is a schematic plan view of a porous alumina layer of a mold. FIG. 5B is a schematic cross-sectional view of the porous alumina layer. FIG. 5C shows a SEM image of a prototype mold.

As shown in FIG. 5A and FIG. 5B, the surface of the mold of the present embodiment has the plurality of first recessed portions 14pa whose two-dimensional size is in the range of more than 20 nm and less than 500 nm and the plurality of second recessed portions 14pb which are superimposedly formed over the plurality of first recessed portions 14pa. The two-dimensional size of the plurality of second recessed portions 14pb is smaller than the two-dimensional size of the plurality of first recessed portions 14pa and does not exceed 100 nm. The height of the second recessed portions 14pb is, for example, more than 20 nm and not more than 100 nm. The second recessed portions 14pb preferably have a generally conical portion as do the first recessed portions 14pa.

The porous alumina layer shown in FIG. 5C was formed as described below.

The aluminum film used was an aluminum film which contains Ti at 1 mass %. The anodization solution used was an oxalic acid aqueous solution (concentration: 0.3 mass %, solution temperature: 10° C.). The etching solution used was a phosphoric acid aqueous solution (concentration: 10 mass %, solution temperature: 30° C.). After the anodization was carried out with a voltage of 80 V for 52 seconds, the etching was carried out for 25 minutes. Then, the anodization was carried out with a voltage of 80 V for 52 seconds, and the etching was carried out for 25 minutes. Thereafter, the anodization was carried out with a voltage of 20 V for 52 seconds, and the etching was carried out for 5 minutes. Further, the anodization was carried out with a voltage of 20 V for 52 seconds.

As seen from FIG. 5C, the second recessed portions whose $D_p$ was about 50 nm were formed in the first recessed portions whose $D_p$ was about 200 nm. When in the above-described manufacturing method the voltage at the first level was changed from 80 V to 45 V for formation of the porous alumina layer, the second recessed portions whose $D_p$ was about 50 nm were formed in the first recessed portions whose $D_p$ was about 100 nm.

When a synthetic polymer film is produced using such a mold, the produced synthetic polymer film has raised portions whose configuration is the inverse of that of the first recessed portions 14pa and the second recessed portions 14pb shown in FIG. 5A and FIG. 5B. That is, the produced synthetic polymer film further includes a plurality of second raised portions superimposedly formed over a plurality of first raised portions.

The thus-produced synthetic polymer film which has the first raised portions and the second raised portions superimposedly formed over the first raised portions has a microbicidal activity on various microorganisms, ranging from relatively small microorganisms of about 100 nm to relatively large microorganisms of not less than 5 μm.

As a matter of course, only raised portions whose two-dimensional size is in the range of more than 20 nm and less than 100 nm may be formed according to the size of a target microorganism. The mold for formation of such raised portions can be manufactured, for example, as described below.

The anodization is carried out using a neutral salt aqueous solution (ammonium borate, ammonium citrate, etc.), such as an ammonium tartrate aqueous solution, or an organic acid which has a low ionic dissociation degree (maleic acid, malonic acid, phthalic acid, citric acid, tartaric acid, etc.) to form a barrier type anodized film. After the barrier type anodized film is removed by etching, the anodization is carried out with a predetermined voltage (the voltage at the second level described above), whereby recessed portions whose two-dimensional size is in the range of more than 20 nm and less than 100 nm can be formed.

For example, an aluminum film which contains Ti at 1 mass % is anodized at 100 V for 2 minutes using a tartaric acid aqueous solution (concentration: 0.1 mol/L, solution temperature: 23° C.), whereby a barrier type anodized film is formed. Thereafter, the etching is carried out for 25 minutes using a phosphoric acid aqueous solution (concentration: 10 mass %, solution temperature: 30° C.), whereby the barrier type anodized film is removed. Thereafter, the anodization and the etching are alternatively repeated as described above, specifically through 5 anodization cycles and 4 etching cycles. The anodization was carried out at 20 V for 52 seconds using an oxalic acid aqueous solution (concentration: 0.3 mass %, solution temperature: 10° C.) as the anodization solution. The etching was carried out for 5 minutes using the above-described etching solution. As a result, recessed portions whose two-dimensional size is about 50 nm can be uniformly formed.

Moth-eye molds which are capable of forming various moth-eye structures can be manufactured as described above.

Figure 6:
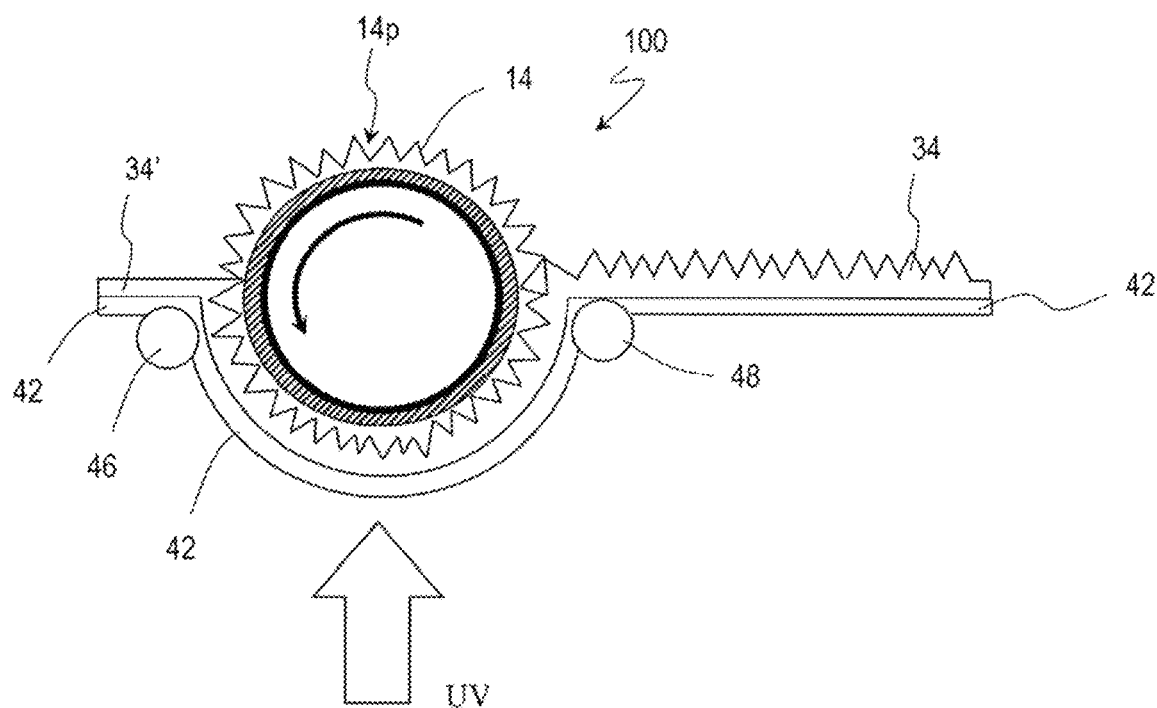
FIG. 6 is a diagram for illustrating a method for producing a synthetic polymer film with the use of the moth-eye mold 100.

Next, a method for producing a synthetic polymer film with the use of a moth-eye mold 100 is described with reference to FIG. 6. FIG. 6 is a schematic cross-sectional view for illustrating a method for producing a synthetic polymer film according to a roll-to-roll method. In the following paragraphs, a method for producing a synthetic polymer film over a surface of a base film as a work using the above-described roll mold will be described. However, a synthetic polymer film production method according to an embodiment of the present invention is not limited to this example but is capable of producing a synthetic polymer film over a surface of various types of works using a mold of a different shape.

First, a moth-eye mold 100 in the shape of a hollow cylinder is provided. Note that the moth-eye mold 100 in the shape of a hollow cylinder is manufactured according to, for example, the manufacturing method described with reference to FIG. 2A, FIG. 2B, FIG. 2C, FIG. 2D, and FIG. 2E.

As shown in FIG. 6, a base film 42 over which a UV-curable resin 34' is applied on its surface is maintained pressed against the moth-eye mold 100, and the UV-curable resin 34' is irradiated with ultraviolet (UV) light such that the UV-curable resin 34' is cured. The UV-curable resin 34' used may be, for example, an acrylic resin. The base film 42 may be, for example, a PET (polyethylene terephthalate) film or a TAC (triacetyl cellulose) film. The base film 42 is fed from an unshown feeder roller, and thereafter, the UV-curable resin 34' is applied over the surface of the base film 42 using, for example, a slit coater or the like. The base film 42 is supported by supporting rollers 46 and 48 as shown in FIG. 6. The supporting rollers 46 and 48 have rotation mechanisms for carrying the base film 42. The moth-eye mold 100 in the shape of a hollow cylinder is rotated at a rotation speed corresponding to the carrying speed of the base film 42 in a direction indicated by the arrow in FIG. 6.

Thereafter, the moth-eye mold 100 is separated from the base film 42, whereby a synthetic polymer film 34 to which the inverted moth-eye structure of the moth-eye mold 100 is transferred is formed on the surface of the base film 42. The base film 42 which has the synthetic polymer film 34 formed on the surface is wound up by an unshown winding roller.

The surface of the synthetic polymer film 34 has the moth-eye structure obtained by inverting the surficial nanostructures of the moth-eye mold 100. According to the surficial nanostructure of the moth-eye mold 100 used, the synthetic polymer films 34A and 34B shown in FIG. 1A and FIG. 1B, respectively, can be produced. The material that forms the synthetic polymer film 34 is not limited to the UV-curable resin but may be a photocurable resin which is curable by visible light.

The microbicidal ability of a synthetic polymer film which has the moth-eye structure over its surface has not only a correlation with the physical structure of the synthetic polymer film but also a correlation with the chemical properties of the synthetic polymer film. For example, the present applicant found correlations with chemical properties, such as a correlation with the contact angle of the surface of the synthetic polymer film (WO 2015/163018), a correlation with the concentration of the nitrogen element contained in the surface (WO 2016/080245), and a correlation with the content of ethylene oxide units (—$CH_2CH_2O$—) in addition to the nitrogen element concentration (WO 2016/208540).

Figure 7A:
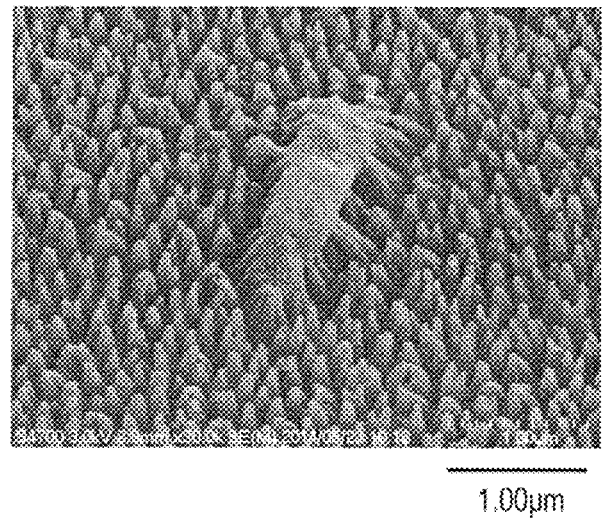
FIG. 7A and FIG. 7B show SEM images obtained by SEM (Scanning Electron Microscope) observation of a *P. aeruginosa* bacterium which died at a surface which had a moth-eye structure.
Figure 7B:
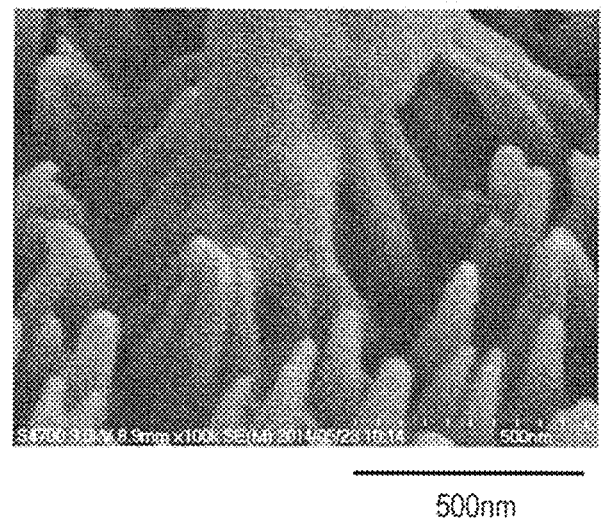

FIG. 7A and FIG. 7B show SEM images disclosed in WO 2016/080245 (FIG. 8). FIG. 7A and FIG. 7B show SEM images obtained by SEM (Scanning Electron Microscope) observation of a *P. aeruginosa* bacterium which died at the surface which had the moth-eye structure shown in FIG. 1A.

As seen from these SEM images, the tip end portions of the raised portions enter the cell wall (exine) of a *P. aeruginosa* bacterium. In FIG. 7A and FIG. 7B, the raised portions do not appear to break through the cell wall but appears to be taken into the cell wall. This might be explained by the mechanism suggested in the "Supplemental Information" section of Ivanova, E. P. et al. That is, it is estimated that the exine (lipid bilayer) of the Gram-negative bacteria came close to the raised portions and deformed so that the lipid bilayer locally underwent a transition like a first-order phase transition (spontaneous reorientation) and openings were formed in portions close to the raised portions, and the raised portions entered these openings. Alternatively, it is estimated that the raised portions were taken in due to the cell's mechanism of taking a polar substance (including a nutrient source) into the cell (endocytosis).

The present inventors further studied a synthetic polymer film which is suitably used for sterilization of a liquid including water and found that the synthetic polymer films disclosed in WO 2015/163018, WO 2016/080245 and WO 2016/208540 still have room for improvement in mass productivity (transferability). One of the possible reasons is that the synthetic polymer films disclosed in WO 2015/163018, WO 2016/080245 and WO 2016/208540 are formed using a photocurable resin which contains an acrylate which has a urethane bond. The acrylate which has a urethane bond has relatively high viscosity and is therefore likely to deteriorate the mold releasability. Thus, for example, such an acrylate causes deterioration of the productivity in mass production based on a roll-to-roll method.

From the viewpoint of mass productivity and water resistance, a synthetic polymer film which includes none of a nitrogen element and a fluorine element is preferred as disclosed in International Application No. PCT/JP2018/030788 of the present applicant. A compound including a quaternary ammonium salt, an amino group, or an amide group, which contains a nitrogen element, has high permeability to the mold releasing agent. Therefore, there is a concern that the compound may deteriorate the mold releasability. Thus, for example, it causes deterioration of the productivity in mass production based on a roll-to-roll method. Also, the compound which contains a nitrogen element has high polarity and therefore disadvantageously affects the water resistance. Note that, of the amino groups (amines), the tertiary amino group (tertiary amine) has lower polarity than the primary and secondary amino groups (amines) and therefore exerts a smaller adverse influence on the mass productivity (transferability) and/or water resistance. On the other hand, when an acrylate which contains a fluorine element is used, the acrylate advantageously affects the mold releasability but the synthetic polymer film has high water repellency so that water is unlikely to permeate the acrylate. As a result, there is a concern that the effect of sterilizing a liquid including water may decrease. The entire disclosure of International Application No. PCT/JP2018/030788 is incorporated by reference in this specification.

Since the nitrogen element has a characteristic which improves the microbicidal activity, there is a concern that a synthetic polymer film which does not contain the nitrogen element may have a decreased microbicidal activity. However, as disclosed in International Application No. PCT/JP2018/030788, a synthetic polymer film whose surface has a microbicidal activity and of which the crosslink structure contains none of a nitrogen element and a fluorine element can be obtained.

The present inventors found that, when a synthetic polymer film contains an organic carboxylic acid as disclosed in Japanese Patent Application No. 2017-226887 of the present applicant, the microbicidal ability achieved by the surface which has the moth-eye structure improves. The organic carboxylic acid only needs to be contained in the synthetic polymer film. The photocurable resin may generate an organic carboxylic acid by photodecomposition. A compound which generates an organic carboxylic acid by photodecomposition may be an initiator (photopolymerization initiator) or may be a compound which does not function as an initiator (herein referred to as "photoacid generator"). When a radically-polymerizable photocurable resin is used as the photocurable resin, a photoacid generator which generates an organic carboxylic acid without generating a radical may be used. The entire disclosure of Japanese Patent Application No. 2017-226887 is incorporated by reference in this specification.

The organic carboxylic acid has a microbicidal ability (or antimicrobial ability) and is used as, for example, food preservatives. It is supposed that the organic carboxylic acid exhibits the microbicidal ability (antimicrobial ability) through various mechanisms. The mechanisms include (1) decreasing the pH in the environment; and (2) allowing undissociated acid to pass through a cell membrane such that the pH inside the cell decreases. In mechanism (2), a weaker acid (an acid having a smaller dissociation constant) contributes more greatly. See, for example, Rosa M. Raybaudi-Massilia et al., "Control of Pathogenic and Spoilage Microorganisms in Fresh-cut Fruits and Fruit Juices by Traditional and Alternative Natural Antimicrobials", COMPREHENSIVE REVIEWS IN FOOD SCIENCE AND FOOD SAFETY, Vol. 8, pp. 157-180, 2009 (particularly, p. 162).

The present inventors formed synthetic polymer films using photocurable resins of different compositions and evaluated the synthetic polymer films as to the antifungal activity. The present inventors found that if, at the lapse of a predetermined time period since placing a water drop on a surface of a synthetic polymer film, the wettability of the surface of the synthetic polymer film for the water drop is high, the surface of the synthetic polymer film has excellent antifungal ability. Herein, the antifungal ability refers to the effect of suppressing or preventing occurrence and/or proliferation of fungi.

Further, the present inventors found that a synthetic polymer film which has at its surface a plurality of raised or recessed portions whose two-dimensional size is not less than 0.5 μm and not more than 3 μm has a tendency to have high wettability at the lapse of a predetermined time period since placing the water drop on its surface, as compared with a synthetic polymer film which has a moth-eye structure at its surface. The synthetic polymer film which has at its surface a plurality of raised or recessed portions whose two-dimensional size is not less than 0.5 μm and not more than 3 μm advantageously has excellent transferability. Thus, even when the synthetic polymer film has the cross-link structure that includes a nitrogen element (e.g., a synthetic polymer film has a urethane bond), decrease of the mass productivity is suppressed. Further, as will be described below with experimental examples, the synthetic polymer film which has at its surface a plurality of raised or recessed portions whose two-dimensional size is not less than 0.5 μm and not more than 3 μm can be produced using a mold which can be manufactured at a lower cost than the moth-eye mold.

[Synthetic Polymer Film]

Sample films of Examples 1 to 5 and Reference Example were produced using UV-curable resins of different compositions. The used materials are shown in TABLE 1. The compositions of Examples 1 to 5 and Reference Example are shown in TABLE 2. The sample films of Examples 1 to 5 and Reference Example include a base film and a synthetic polymer film provided on the base film as does the film 50A shown in FIG. 1A but are different from the film 50A in the surface structure of the synthetic polymer film (i.e., the uneven structure formed by a plurality of raised or recessed portions at the surface of the synthetic polymer film). The synthetic polymer films each having a plurality of raised or recessed portions at their surface were formed on the base films using respective mold samples in the same way as that previously described with reference to FIG. 6 except for the difference in the surface structure of the mold sample. Herein, the base film used was a 75 μm thick PET film (Tetoron 75G2 manufactured by Teijin Film Solutions Limited; "Tetoron" is a registered trademark). The exposure amount was about 200 mJ/cm$^2$ (on the basis of light at the wavelength of 375 nm). In each sample, the synthetic polymer film was produced without using a solvent.

TABLE 1

| MATERIALS | Abbreviation | Product Name | Manufacturer Name | Compound Name | Water Solubility | EO group | MW | Number of moles of EO | EO mass % |
|---|---|---|---|---|---|---|---|---|---|
| Acrylic Monomer | UA7100 | UA-7100 | Shin Nakamura Chemical Co., Ltd. | urethane acrylate | YES | YES | 1907 | 27 | 62 |
| | A600 | A600 | Shin Nakamura Chemical Co., Ltd. | polyethylene glycol (600) diacrylate | YES | YES | 708 | 14 | 87 |
| | M280 | M280 | MIWON | polyethylene glycol (400) diacrylate | YES | YES | 508 | 9 | 78 |
| | DPHA | A-DPH | Shin Nakamura Chemical Co., Ltd. | dipentaerythritol hexaacrylate | NO | NO | 578 | — | — |
| | ATMM3LMN | A-TMM-3LM-N | Shin Nakamura Chemical Co., Ltd. | pentaerythritol triacrylate | NO | NO | 298 | — | — |
| | HEA | HEA | Osaka Organic Chemical Industry Ltd. | hydroxyethyl acrylate | YES | NO | 116 | — | — |
| | ACMO | ACMO | KJ Chemicals Corporation | N,N-acryloylmorpholine | YES | NO | 99 | — | — |
| Mold Releasing Agent | SAG003 | Silface SAG003 | Nissin Chemical Industry Co., Ltd. | silicone-based surfactant | — | unknown | — | — | — |
| Polymerization Initiator | TPO | IRGACURE TPO | IGM Resins | diphenyl (2,4,6-trimethylbenzoyl) phosphine oxide | — | — | — | — | — |
| | 819 | IRGACURE 819 | IGM Resins | bis (2,4,6-trimethylbenzoyl)-phenylphosphine oxide | — | — | — | — | — |

TABLE 2

| | Acrylic Monomer | | | | | | | Initiator | | Mold Releasing Agent |
|---|---|---|---|---|---|---|---|---|---|---|
| | UA7100 | A600 | M280 | DPHA | ATMM3LMN | HEA | ACMO | 819 | TPO | SAG003 |
| Example 1 | 50.3% | | | | 17.7% | | 29.1% | 1.5% | 1.5% | |
| Example 2 | | | 93.3% | | | | 2.9% | 2.9% | | 1.0% |
| Example 3 | | | 93.3% | | | | 2.9% | 2.9% | | 1.0% |
| Example 4 | | | 93.3% | | | | 2.9% | 2.9% | | 1.0% |
| Example 5 | | | 93.3% | | | | 2.9% | 2.9% | | 1.0% |
| Reference Example | | 69.9% | | 22.3% | | 4.9% | | | 2.9% | |

Figure 8A:
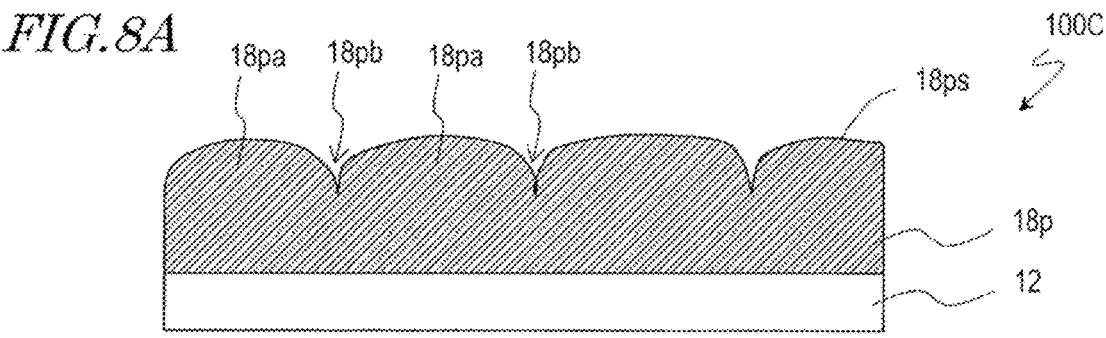
FIG. 8A is a schematic cross-sectional view of a mold 100C for formation of a synthetic polymer film 34C of another embodiment of the present invention.
Figure 8B:
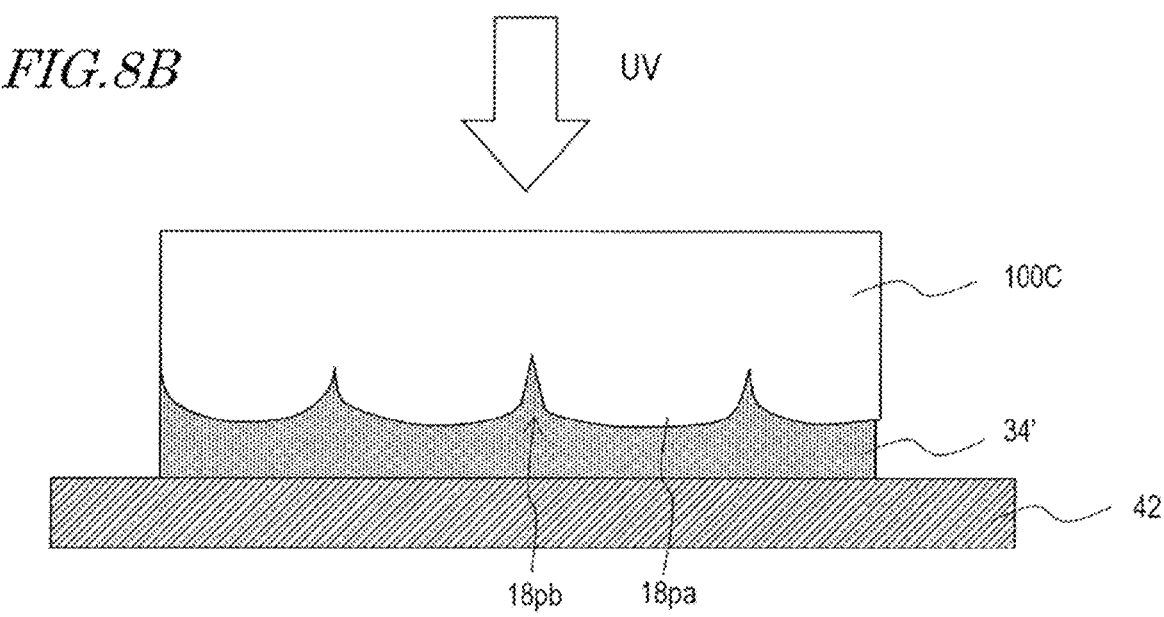
FIG. 8B is a schematic cross-sectional view for illustrating a method for producing the synthetic polymer film 34C using the mold 100C.
Figure 8C:
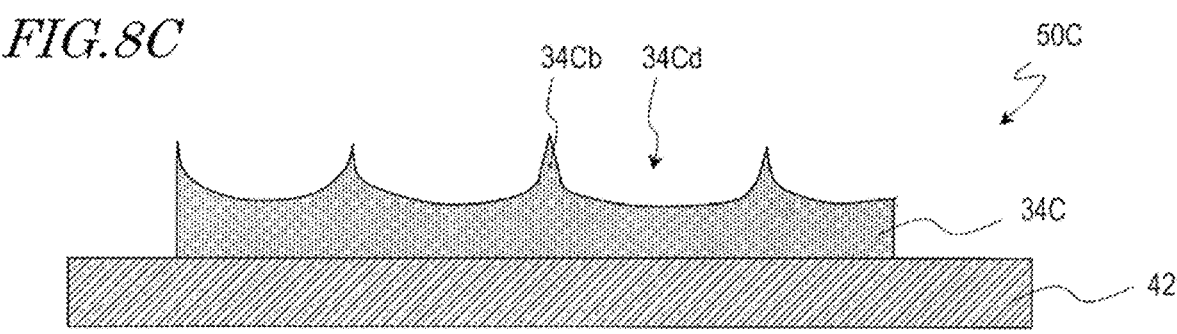
FIG. 8C is a schematic cross-sectional view of a film 50C which includes the synthetic polymer film 34C.

Now, the structure and production method of the sample films of Examples 2 to 5 are described with reference to FIG. 8A, FIG. 8B and FIG. 8C. FIG. 8A is a schematic cross-sectional view of a mold 100C for formation of a synthetic polymer film 34C of an embodiment of the present invention. FIG. 8B is a schematic cross-sectional view for illustrating a method for producing the synthetic polymer film 34C using the mold 100C. FIG. 8C is a schematic cross-sectional view of a film 50C which includes the synthetic polymer film 34C. Features which are common with those of the film 50A are designated by the same symbols, and the descriptions thereof are sometimes omitted.

First, the mold samples used for production of the sample films of Examples 2 to 5 and a manufacturing method thereof are described with reference to FIG. 8A.

As shown in FIG. 8A, a mold 100C is obtained by forming an aluminum layer 18p on the base 12. The material of the base 12 may be an acid-resistant insulating material, such as, for example, glass, ceramic, plastic material, etc. Alternatively, the base 12 may be, for example, an aluminum base. Still alternatively, for example, the base 12 may be realized by applying an insulating material on a metal material other than aluminum. The surface of the base 12 may be, for example, any of a flat surface, a curved surface, and a roll surface. At a surface 18ps of the aluminum layer 18p, there are a plurality of crystal grains 18pa, the average crystal grain diameter of which is not less than 0.5 μm and not more than 3 μm. In FIG. 8A, grain boundaries 18pb which are present at the surface 18ps of the aluminum layer 18p are schematically shown. The aluminum layer 18p can be formed using, for example, a vacuum deposition method, such as sputtering and electron beam deposition. The surface of the mold 100C has a plurality of raised portions corresponding to the crystal grains 18pa. The gaps between adjoining raised portions correspond to the grain boundaries 18pb. In the example illustrated in the drawings, there is no flat portion between adjoining raised portions. The mold 100C has at its surface an uneven structure including a plurality of raised portions whose two-dimensional size is not less than 0.5 μm and not more than 3 μm. The mold 100C includes the aluminum layer 18p at its surface. The surface of the aluminum layer 18p has the above-described uneven structure.

The aluminum layer 18p is, for example, a high-purity aluminum layer. The high-purity aluminum layer 18p is made of, for example, aluminum whose purity is not less than 99.99 mass %. The thickness of the high-purity aluminum layer 18p is, for example, not less than 2 μm and not more than 6 μm.

The aluminum layer 18p may be, for example, an aluminum alloy layer which contains aluminum (Al) and titanium (Ti). The content of Ti in the aluminum alloy layer 18p is, for example, not less than 0.01 mass % and not more than 1 mass %. The thickness of the aluminum alloy layer 18p is, for example, not less than 4 μm and not more than 6 μm. When the thickness of the aluminum alloy layer 18p was less than 4 μm, crystal grains of a desired size were not formed in some cases.

The mold 100C may further include an inorganic underlayer (not shown) under the aluminum layer 18p. The inorganic underlayer can be made of, for example, an inorganic oxide or an inorganic nitride. For example, the inorganic underlayer is a silicon oxide layer, a tantalum oxide layer, a titanium oxide layer, or an AZO (aluminum-doped zinc oxide) layer. The thickness of the inorganic underlayer is, for example, not less than 50 nm and not more than 300 nm.

The mold sample of Example 2 was obtained by forming a high-purity aluminum layer (thickness: 4 μm, aluminum purity: 99.99 mass % or higher) on a glass substrate (5 cm×10 cm). The sample film of Reference Example was produced using the mold sample of Example 2. The mold sample of Example 3 was obtained by forming an aluminum alloy layer (thickness: 6 μm) on a glass substrate (5 cm×10 cm). The mold sample of Example 4 was obtained by forming an aluminum alloy layer (thickness: 4 μm) on a glass substrate (5 cm×10 cm). In each of the mold samples of Example 3 and Example 4, the aluminum alloy layer contained aluminum (Al) and titanium (Ti), and the content of Ti in the aluminum alloy layer was 0.5 mass %. The mold sample of Example 5 was obtained as follows. First, a 400 nm thick film of AZO (1.5 mass % $Al_2O_3$ doped ZnO) was formed on a glass substrate (5 cm×10 cm) by pulse laser deposition. Then, the AZO film was brought into contact with an etchant (0.36% hydrochloric solution) so as to be partially removed (half etching). Thereafter, an aluminum alloy layer (thickness: 1 μm) was formed on the remaining AZO film. The aluminum alloy layer contained aluminum (Al) and titanium (Ti) as did the aluminum alloy layer in the mold samples of Example 3 and Example 4, and the content of Ti in the aluminum alloy layer was 0.5 mass %.

According to WO 2011/052652 of the present applicant, by adjusting the deposition conditions of an aluminum film which is to be formed on a substrate (e.g., glass substrate), the crystal grain diameter of a plurality of crystal grains at the surface of the aluminum film can be adjusted. For example, by adjusting the deposition conditions in forming an aluminum film of not less than 0.5 μm and not more than 5 μm in thickness, an aluminum film can be formed which has at the surface a plurality of crystal grains whose average crystal grain diameter is not less than 200 nm and not more than 5 μm. As disclosed in WO 2016/084745 of the present applicant, by adjusting the composition and/or the deposition conditions (e.g., the thickness of the aluminum alloy layer) of the aluminum alloy layer which contains Al and Ti, the crystal grain diameter of a plurality of crystal grains at the surface of the aluminum alloy layer can be adjusted. When a porous alumina layer obtained by alternately performing anodization and etching on the thus-obtained aluminum alloy layer or aluminum film is used as the mold, an antireflection film which can perform an antiglare function can be formed. Note that, however, the mold samples of Examples 2 to 5 were obtained without performing anodization or etching on a high-purity aluminum layer or aluminum alloy layer. The entire disclosures of WO 2011/052652 and WO 2016/084745 are incorporated by reference in this specification.

The shape of the uneven structure at the surface of the mold 100C can be changed by a way other than adjusting the deposition conditions for the aluminum layer (high-purity aluminum layer or aluminum alloy layer) 18p. For example, by forming an inorganic underlayer under the aluminum layer 18p, the surface shape of the inorganic underlayer can be reflected in the surface of the aluminum layer 18p. Further, by bringing the surface of the inorganic underlayer into contact with an etchant, the depth (height) of the uneven structure at the surface of the inorganic underlayer may be increased. Alternatively, by bringing the surface of the aluminum layer 18p into contact with an etchant, the depth (height) of the uneven structure at the surface of the aluminum layer 18p can be increased. For example, the etching is performed for 50 minutes or more using a phosphoric acid aqueous solution (10 mass %, 30° C.). These methods may be used together as a matter of course. When the shape of the uneven structure at the surface of the mold 100C is thus adjusted by a way other than adjusting the deposition conditions for the aluminum layer 18p, the thickness of the aluminum layer 18p may be smaller than the above-described range. For example, the thickness of the high-purity aluminum layer 18p may be not less than 1 µm and less than 2 µm. The thickness of the aluminum alloy layer 18p may be not less than 1 µm and less than 4 µm. If the thickness of the aluminum layer (high-purity aluminum layer or aluminum alloy layer) 18p is large, the grain boundaries 18pb are deep so that the transferability can deteriorate. When an inorganic underlayer is provided under the aluminum layer 18p, the thickness of the aluminum layer 18p can be reduced and, therefore, excellent transferability can advantageously be achieved.

The aluminum layer 18p may have a layered structure which includes a high-purity aluminum layer and an aluminum alloy layer. In this case, it is preferred that the thickness of the high-purity aluminum layer is not less than 1 µm. It is also preferred that the mold 100C includes a high-purity aluminum layer at the surface of the mold 100C. That is, it is preferred that a high-purity aluminum layer is provided on the aluminum alloy layer.

A synthetic polymer film can be produced using the mold 100C in the same way as illustrated with reference to FIG. 6. As shown in FIG. 8B, a UV-curable resin 34' applied between a surface of a work 42 and the mold 100C is irradiated with ultraviolet light (UV) via the mold 100C, whereby the UV-curable resin 34' is cured. The UV-curable resin 34' may be applied to the surface of the work 42 or may be applied to the die surface of the mold 100C (the surface which has the uneven structure). The UV-curable resin used may be, for example, an acrylic resin.

Thereafter, the mold 100C is separated from the work 42, whereby a cured material layer of the UV-curable resin 34' to which the uneven structure of the mold 100C (the uneven structure formed by the plurality of raised portions) is transferred is formed on the surface of the work 42 as shown in FIG. 8C. In this way, a synthetic polymer film 34C is obtained which has an uneven structure that is the inverse of the uneven structure formed by the plurality of raised portions 18pa whose two-dimensional size is not less than 0.5 µm and not more than 3 µm. The film 50C includes a base film 42 and a synthetic polymer film 34C formed on the base film 42. The synthetic polymer film 34C has a plurality of recessed portions 34Cd at its surface. When viewed in a normal direction of the synthetic polymer film 34C, the two-dimensional size of the recessed portions 34Cd is in the range of not less than 0.5 µm and not more than 3 µm. The two-dimensional size of the recessed portions 34Cd may be in the range of not less than 0.5 µm and less than 1 µm. The recessed portions 34Cd are demarcated by raised portions 34Cb which correspond to the grain boundaries 18pb. The synthetic polymer film 34C may not have, for example, a flat portion between adjoining recessed portions 34Cd. The flat portion refers to, for example, a portion whose maximum height is less than 10 nm.

Figure 9A:
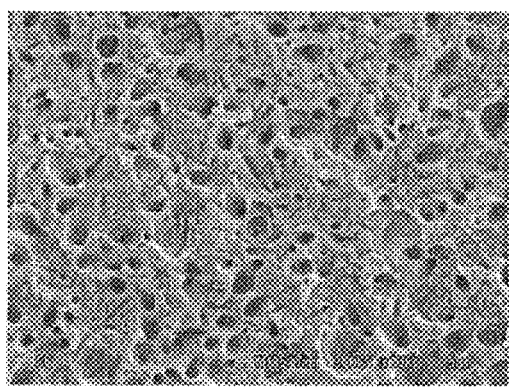
FIG. 9A shows a SEM image of a surface of a mold sample of Example 1.
Figure 9B:
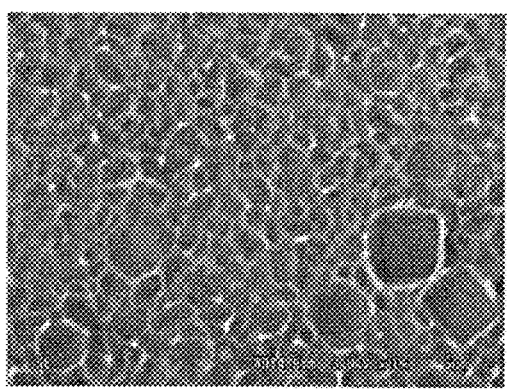
FIG. 9B shows a SEM image of a surface of a mold sample of Example 2.
Figure 9C:
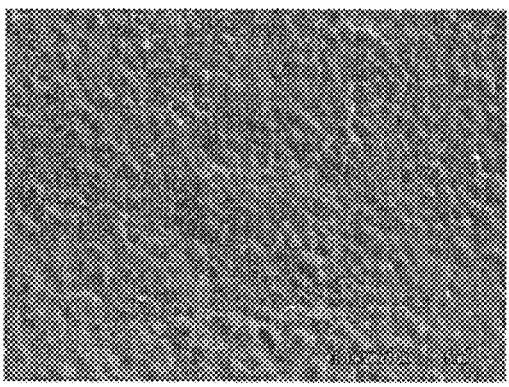
FIG. 9C shows a SEM image of a surface of a mold sample of Example 3.
Figure 9D:
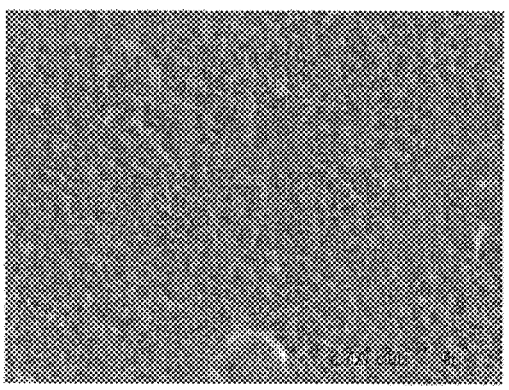
FIG. 9D shows a SEM image of a surface of a mold sample of Example 4.
Figure 9E:
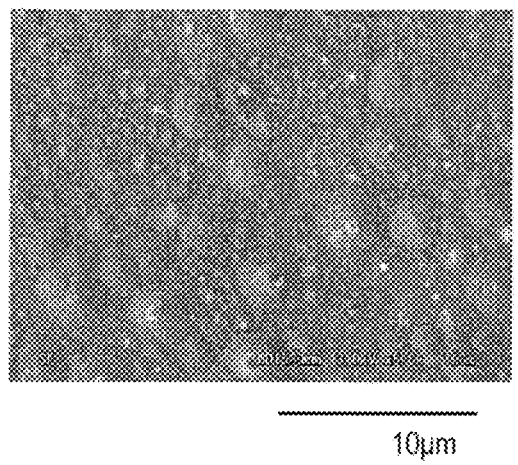
FIG. 9E shows a SEM image of a surface of a mold sample of Example 5.
Figure 10A:
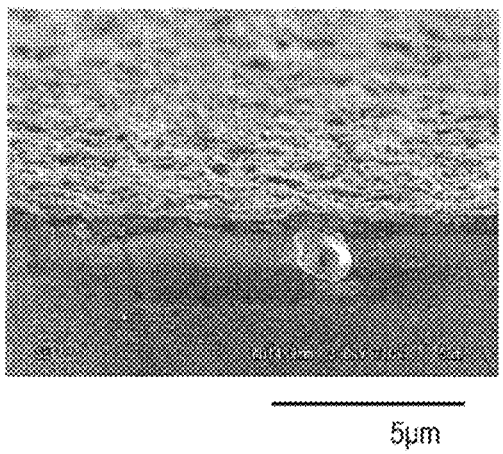
FIG. 10A shows a SEM image of a cross section of the mold sample of Example 1.
Figure 10B:
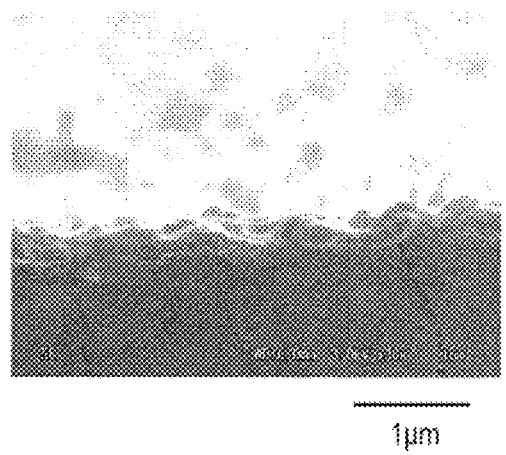
FIG. 10B shows a SEM image of a cross section of the mold sample of Example 2.
Figure 10C:
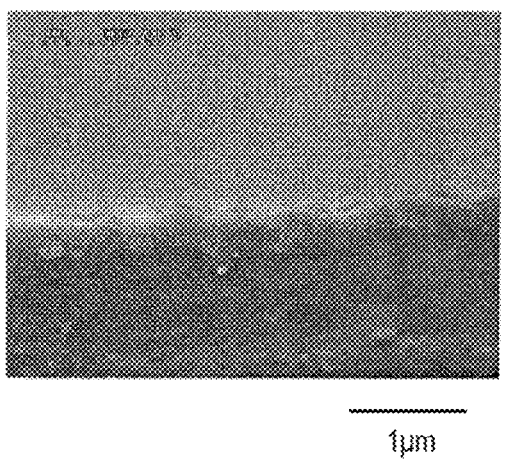
FIG. 10C shows a SEM image of a cross section of the mold sample of Example 3.
Figure 10D:
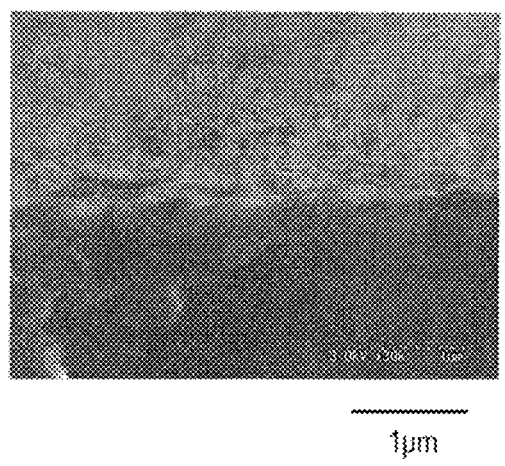
FIG. 10D and FIG. 10E show SEM images of a cross section of the mold sample of Example 4.
Figure 10E:
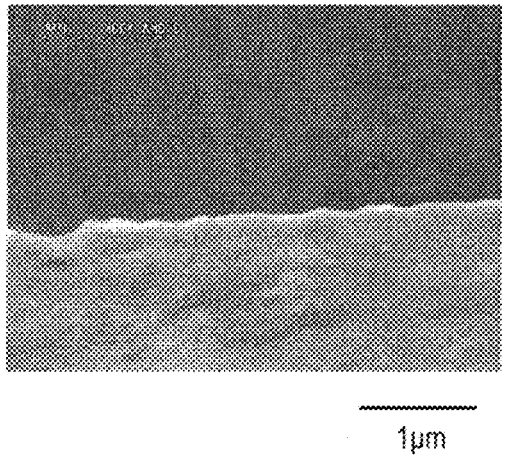
Figure 10F:
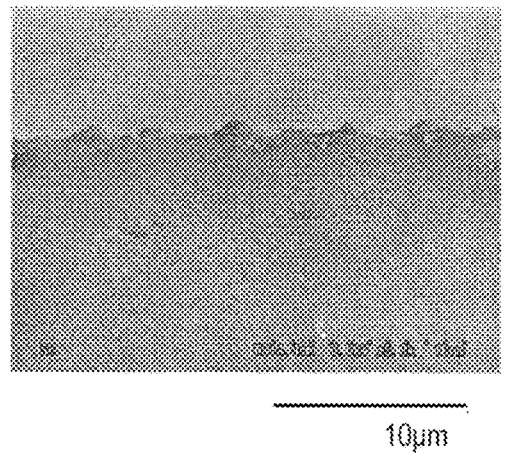
FIG. 10F shows a SEM image of a cross section of the mold sample of Example 5.

FIG. 9A, FIG. 9B, FIG. 9C, FIG. 9D and FIG. 9E show SEM images of the surfaces of the mold samples of Examples 1 to 5. FIG. 10A, FIG. 10B, FIG. 10C, FIG. 10D, FIG. 10E and FIG. 10F show SEM images of cross sections of the mold samples of Examples 1 to 5. FIG. 9A, FIG. 9B, FIG. 9C, FIG. 9D and FIG. 9E are SEM images of the surfaces of the mold samples of Examples 1 to 5, respectively. FIG. 9A, FIG. 9B, FIG. 9C and FIG. 9D are surface SEM images of 1.0000 magnifications. FIG. 9E is a surface SEM image of 5000 magnifications. FIG. 10A is a SEM image (10000 magnifications) of a cross section of the mold sample of Example 1. FIG. 10B is a SEM image (30000 magnifications) of a cross section of the mold sample of Example 2. FIG. 10C is a SEM image (30000 magnifications) of a cross section of the mold sample of Example 3. FIG. 10D and FIG. 10E are SEM images (30000 magnifications) of a cross section of the mold sample of Example 4. FIG. 10F is a SEM image (5000 magnifications) of a cross section of the mold sample of Example 5.

[Evaluation of Uneven Structure at Mold Sample Surface]

From the SEM images of the mold samples shown in FIG. 9A, FIG. 9B, FIG. 9C, FIG. 9D and FIG. 9E, and FIG. 10A, FIG. 10B, FIG. 10C, FIG. 10D, FIG. 10E and FIG. 10F, the two-dimensional size P and height H of a plurality of raised portions (plurality of crystal grains), the largeness of a flat portion between adjoining raised portions, and the aspect ratio H/P were determined as follows. The evaluation results are shown in TABLE 3 below. In TABLE 3, the results are accompanied by a number in parentheses which is a representation of one significant digit. The synthetic polymer film included in each of the sample films of Examples 1 to 5 and Reference Example has an uneven structure at its surface, which is the inverse of the uneven structure of the surface of the respective mold sample. Note that, as previously stated, the sample film of Reference Example was produced using the mold sample of Example 2.

As shown in FIG. 9A, FIG. 9B, FIG. 9C, FIG. 9D and FIG. 9E, the mold samples of Examples 1 to 5 have a plurality of raised portions at their surfaces. Particularly, it is seen from FIG. 9B, FIG. 9C, FIG. 9D and FIG. 9E that the mold samples of Examples 2 to 5 have raised portions corresponding to crystal grains and have recessed portions at the grain boundaries as previously described with reference to FIG. 8A, FIG. 8B and FIG. 8C. Also, it is seen from FIG. 9A, FIG. 9B, FIG. 9C, FIG. 9D and FIG. 9E that the raised portions at the surface of the mold samples of Examples 1 to 5 are arranged randomly.

The two-dimensional size P of the plurality of raised portions was determined from the surface SEM images of the mold samples as follows. As for the mold samples of Examples 1 to 4, a region of 9 µm×12 µm was selected from the surface SEM images (10000 magnifications) of the mold samples as shown in FIG. 9A, FIG. 9B, FIG. 9C and FIG. 9D, respectively. From the selected region, 20 crystal grains, except for crystal grains which are discontinuously large as compared with the majority of the crystal grains (also referred to as "abnormal grains"), were arbitrarily selected, and the average area equivalent circle diameter of the selected crystal grains was determined. For example, grains of particularly large grain diameters which are seen at the lower right corner of the SEM image of FIG. 9B are abnormal grains. For the mold sample of Example 5, a surface SEM image of a different magnification was used. As shown in FIG. 9E, a region of 18 µm×24 µm was selected from a surface SEM image (5000 magnifications) of the mold sample, and the evaluation was carried out using the selected region in the same way as Examples 1 to 4. Note that relatively large crystal grains in FIG. 9E occupied about a half of the surface area of the mold sample of Example 5 and were therefore not treated as abnormal grains.

Occurrence of abnormal grains can be suppressed by adjusting the composition and/or the deposition conditions of the aluminum layer as disclosed in, for example, WO 2016/084745 of the present applicant. Thus, the haze value of a resultant antireflection film can be controlled with high accuracy. However, it is considered that abnormal grains formed in the aluminum layer do not matter when the antifungal ability of the uneven structure at the surface is utilized. For example, when viewed in a normal direction of the surface of the mold, abnormal grains may occupy 5% or more of the surface area of the surface of the mold. When viewed in a normal direction of the surface of the mold, the two-dimensional size of abnormal grains is, for example, not less than 2 μm.

For the height H of the plurality of raised portions, n raised portions (8<n<30) are arbitrarily selected from a cross-sectional SEM image of the mold sample such as shown in FIG. 10A, FIG. 10B, FIG. 10C, FIG. 10D, FIG. 10E and FIG. 10F, and the average height of the selected raised portions was determined. Here, Example 1: n=11, Example 2: n=19, Example 3: n=14, Example 4: n=14, Example 5: n=18.

The aspect ratio H/P was determined using the value of the two-dimensional size P of the plurality of raised portions and the value of the height H of the plurality of raised portions which were obtained as described above.

The largeness of the flat portion between adjoining raised portions was evaluated as follows. From a cross-sectional SEM image of the mold sample such as shown in FIG. 10A, FIG. 10B, FIG. 10C, FIG. 10D, FIG. 10E and FIG. 10F, n pairs of adjoining raised portions (8<n<30) were arbitrarily selected. The length of a portion between adjoining raised portions which had the maximum height of less than 10 nm was measured for each pair, and the measured lengths were averaged. When the length of a portion having the maximum height of less than 10 nm was less than 0.05 μm, it was determined that the length was zero (i.e., it was determined that there was no flat portion between adjoining raised portions). Herein, Example 5: n=21. As seen from TABLE 3, the mold samples of Examples 1 to 4 have no flat portion between adjoining raised portions.

For each sample film, the evaluation results as to the antifungal ability and the film surface properties are shown in TABLE 3 below. The evaluated film surface properties were the spreadability of a water drop over the surface of the synthetic polymer film, the change of the pH of the water drop, and the change of the static contact angle of the water drop.

Evaluation of Antifungal Ability

The sample films were evaluated as to the antifungal ability for the fungal solution (water) adhered to or sprinkled over the sample films. The sample films to which the fungal solution was applied and which were left in atmospheric air at room temperature were evaluated as to the antifungal ability. Herein, the antifungal ability for *Cladosporium Cladosporioides* was evaluated. A specific evaluation method is described in the following paragraphs. For each sample film, an experiment was carried out with N=3.

Beforehand, each sample film was left for two weeks in an environment of 25° C. and RH 50% or in an environment of 60° C. and RH 90%. Thereafter, the surface of the sample film was wiped with a BEMCOT wiper (cupro continuous-filament nonwoven fabric manufactured by Asahi Kasei Corporation) impregnated with ethanol.

(1) A fungal solution containing *Cladosporium Cladosporioides* was prepared using a glucose peptone broth (GPB) (manufactured by NISSUI PHARMACEUTICAL CO., LTD.) such that the initial fungal count was 1E+06 CFU/mL.

(2) On each sample film (a square of 5 cm on each side), 100 μL of the above-described fungal solution was dropped.

(3) The sample films were left in an environment at 25° C. with the humidity of 90% or higher for one week. Then, the degree of growth of fungus (*Cladosporium Cladosporioides*) was visually checked and judged on the following criteria.

For the degree of growth of *Cladosporium Cladosporioides*, the area and the depth of black of a portion of the surface of the sample films which was colored black with *Cladosporium Cladosporioides* were visually checked. The antifungal ability was evaluated in comparison with the antifungal ability of a reference film. The reference film used was a 75 μm thick PET film (Tetoron 75G2 manufactured by Teijin Film Solutions Limited; "Tetoron" is a registered trademark) which was used as the base film.

0: No colored portion was visually detected.

1: A colored portion was slightly visually detected. The area of the colored portion was less than 10% of the area of a region over which the fungal solution dropped on the surface of the sample films spread.

2: A colored portion was visually detected. The area of the colored portion was less than 80% of the area of a region over which the fungal solution dropped on the surface of the sample films spread.

3: It was visually detected that 80% or more of a region over which the fungal solution dropped on the surface of the sample films spread was colored. However, the color was light.

4: It was visually detected that 80% or more of a region over which the fungal solution dropped on the surface of the sample films spread was brightly colored. However, the color was lighter than the PET film.

5: It was visually detected that 80% or more of a region over which the fungal solution dropped on the surface of the sample films spread was colored to a depth generally equal to the PET film. The colored portion includes a part whose thickness is greater than the thickness of the dropped fungal solution.

The judgement as to the antifungal ability was based on the total score of each sample film (aggregate of N=3) such that ○: 0 to 2, Δ: 3 to 7, and x: 8 or more. When the total score was not more than 7, the sample film was judged to be usable.

Evaluation of Film Surface Properties: Degree of Spread of Water Over Synthetic Polymer Film, pH Measurement, and Measurement of Static Contact Angle of Water Deionized water was adjusted to pH=7.0±0.1 using 0.01 mol/L hydrochloric solution and 0.011 mol/L sodium hydroxide solution. That is, neutral water was prepared in this way.

On the surface of each sample film, a 0.2 cc (200 μL) drop of the above-described pH-adjusted water was placed using a micropipette. Thereafter, the maximum spread diameter (area equivalent circle diameter) up to 5 min was measured, and the average value for five measurements from each sample film was evaluated.

The measurement of the pH was carried out as follows.

In the same way as that described above, on the surface of each sample film, a 0.2 cc (200 μL) drop of the above-described pH-adjusted water was placed using a micropipette. After the passage of 5 minutes, the aqueous solution (water in which an extract from the synthetic polymer film was dissolved) on the surface of each sample film was measured using an electrode for flat samples which is described below, and the average value for five measurements from each sample film was evaluated.

Note that a sample film over which the spread of the water was less than 20 mm was evaluated using a sampling sheet otherwise the diameter of the water drop increased in the pH measurement.

Electrode: pH electrode, product number: 0040-10D (semiconductor sensor) manufactured by HORIBA, Ltd.

Sampling sheet: sampling sheet B, product number: Y011A manufactured by HORIBA, Ltd.

The static contact angle of water with respect to the surface of the synthetic polymer film of each sample film was measured as follows.

The contact angle of water with respect to the surface of the synthetic polymer film of each sample film was measured using a contact angle meter (PCA-1 manufactured by Kyowa Interface Science Co., Ltd). A drop of water (about 10 µL) was placed on the surface of the synthetic polymer film of each sample film. The contact angle was measured at the lapse of 1 second, 10 seconds and 60 seconds since placing the water drop. The average value of five measurements of the contact angle for each case was determined.

required for dissolving 1 g or 1 mL of the solute using the solubility index (1 to 7) and the terms shown below.
1: Very soluble
Less than 1 mL
2: Freely soluble
Equal to or greater than 1 mL and less than 10 mL
3: Soluble
Equal to or greater than 10 mL and less than 30 mL
4: Sparingly soluble
Equal to or greater than 30 mL and less than 100 mL
5: Slightly soluble
Equal to or greater than 100 mL and less than 1000 mL
6: Very slightly soluble
Equal to or greater than 1000 mL and less than 10000 mL
7: Practically insoluble
Not less than 10000 mL The amount of water required for dissolving 1 g of TMBA is equal to or greater than 1000 mL and less than 10000 mL

TABLE 3

| | Two-dimensional Size P (µm) | Height H (µm) | Flat Portion (µm) | Aspect Ratio H/P | Acid Type | Water Contact Angle (°) 1 sec | 10 sec | 60 sec | Water Spread (mm) | pH | Antifungal Ability Total Score | Judge |
|---|---|---|---|---|---|---|---|---|---|---|---|---|
| Example 1 | 0.45 (0.5) | 0.24 (0.2) | 0 | 0.5 | TMBA/DPPA | 41.8 | 16.9 | 2.7 | 38.5 | 3.7 | 1 | ○ |
| Example 2 | 0.74 (0.7) | 0.16 (0.2) | 0 | 0.2 | TMBA | 16.5 | 3.6 | <3 | 52.0 | 3.4 | 0 | ○ |
| Example 3 | 0.52 (0.5) | 0.066 (0.07) | 0 | 0.1 | TMBA | 21.7 | 11.4 | <3 | 42.0 | 3.7 | 3 | Δ |
| Example 4 | 0.60 (0.6) | 0.062 (0.06) | 0 | 0.1 | TMBA | 18.5 | 5.3 | <3 | 42.0 | 3.6 | 1 | ○ |
| Example 5 | 3.2 (3) | 0.48 (0.5) | 0.97 (1) | 0.2 | TMBA | 17.9 | 3.7 | <3 | 52.5 | 3.4 | 2 | ○ |
| Reference Example | 0.74 (0.7) | 0.16 (0.2) | 0 | 0.2 | TMBA/DPPA | 56.7 | 52.8 | 44.4 | 14.0 | 5.0 | 12 | x |

The synthetic polymer films of Examples 1 to 5 and Reference Example were formed using a UV-curable resin composition containing an acrylic monomer (UA7100, A600 or M280) which had an ethylene oxide unit (EO unit). Therefore, the synthetic polymer films of Examples 1 to 5 and Reference Example have appropriate hydrophilicity.

Polymerization initiator 819 used in Examples 1 to 5 generates 2,4,6-trimethylbenzoic acid (TMBA) by photodecomposition. Polymerization initiator TPO used in Example 1 and Reference Example generates TMBA and diphenyl phosphoric acid (DPPA).

The organic carboxylic acid only needs to be contained in the synthetic polymer film. The photocurable resin may generate an organic carboxylic acid by photodecomposition. The compound which generates an organic carboxylic acid by photodecomposition may be an initiator or may be a photoacid generator which does not function as the initiator as described above. When a radically-polymerizable photocurable resin is used as the photocurable resin, a photoacid generator which generates an organic carboxylic acid without generating a radical can be used. The compound which generates an organic carboxylic acid by photodecomposition is, advantageously, unlikely to deteriorate the transferability. Also, advantageously, the compound can simultaneously generate the organic carboxylic acid and another water-soluble organic acid (an acid stronger than carboxylic acid).

It is preferred that the solubility of the organic carboxylic acid in water is not excessively high. This is because, if the solubility of the organic carboxylic acid in water is excessively high, the antifungal effect in a high-temperature, high-humidity environment decreases earlier.

The solubility of a solute in water at about 20° C. to about 25° C. are represented based on the amount of water (solubility index: 6). The amount of water required for dissolving 1 g of the organic carboxylic acid is preferably equal to or greater than 10 mL and less than 10000 mL (solubility index: 3 to 6). The amount of water is preferably equal to or greater than 100 mL, more preferably equal to or greater than 200 mL, and is preferably less than 2000 mL. The amount of water required for dissolving 1 g of DPPA is less than 1 mL (solubility index: 1).

The organic carboxylic acid and/or the compound which generates an organic carboxylic acid by photodecomposition (initiator and/or photoacid generator) may be mixed in the photocurable resin composition such that the proportion of the organic carboxylic acid and/or the compound to the entirety of the photocurable resin composition is generally equal to or greater than 1 mass % and not more than 10 mass %. If the proportion is less than 1 mass %, the effect of improving the microbicidal ability cannot be achieved sometimes. If the proportion is more than about 10 mass %, there is a concern that the organic carboxylic acid may deteriorate the physical properties of the cured material (photocured resin composition). To suppress the influence on the physical properties of the cured material, it is preferred that the proportion is not more than about 5 mass %. Specifically, according to the type of the photocurable resin and the type of the organic carboxylic acid and/or the compound which generates an organic carboxylic acid by photodecomposition, the amount of the contained organic carboxylic acid and/or compound may be properly adjusted.

As described in Japanese Patent Application No. 2017-226887 of the present applicant, it was found that the fast spreading of water dropped onto the surface of the synthetic polymer film advantageously affects the microbicidal ability.

That is, it is preferred that the degree of spread of water (area equivalent circle diameter) is large. In this process, due to an acid extracted into water, the pH of the aqueous solution (water drop) decreases (becomes acidified) within a relatively short time period. A microbicidal activity which is attributed to this decrease of the pH effectively works. From the viewpoint of the microbicidal ability, for example, the area equivalent circle diameter of the aqueous solution at the lapse of 5 minutes since placing a 200 µL water drop on the surface of the synthetic polymer film is preferably not less than 20 mm. The pH of the aqueous solution at the lapse of 5 minutes since placing the water drop is preferably not more than 5. If the pH of the aqueous solution at the lapse of 5 minutes since placing the water drop is not more than 5, a microbicidal activity which is attributed to taking of an undissociated organic carboxylic acid into a cell effectively works.

It can be seen from the comparison between Examples 1 to 5 of the embodiment of the present invention and Reference Example that the antifungal ability also has a similar tendency. The degree of spread of water dropped on the surface of the synthetic polymer film is preferably large, while the pH of the aqueous solution at the lapse of 5 minutes since placing the water drop is preferably small. Note that, however, from the viewpoint of the antifungal ability, it is preferred that the pH of the aqueous solution at the lapse of 5 minutes since placing the water drop is less than 4. The degree of spread of water (area equivalent circle diameter) is preferably not less than 20 mm, more preferably not less than 30 mm, still more preferably not less than 35 mm.

Also, it can be seen from the comparison between the results of Examples 1 to 5 and Reference Example that, at the lapse of 60 seconds since placing the water drop on the surface of the synthetic polymer film, the surface of the synthetic polymer film preferably exhibits high wettability for liquid drops. It is preferred that, at the lapse of 60 seconds since placing a water drop on the surface of the synthetic polymer film, the static contact angle of the water drop with respect to the surface of the synthetic polymer film is less than 3°.

As seen from the results of Examples 1 to 5, a synthetic polymer film of an embodiment of the present invention has an excellent antifungal ability when a two-dimensional size of a plurality of recessed portions at the surface of the synthetic polymer film are in the range of, for example, not less than 0.5 µm and not more than 3 µm. That is, it is estimated that so long as the pH of the aqueous solution is less than 4, the degree of spread of water is not less than 20 mm at the lapse of 5 minutes, and the static contact angle of the water drop at the lapse of 60 seconds since placing the water drop on the surface of the synthetic polymer film is less than 3°, the synthetic polymer film has an excellent antifungal ability irrespective of whether the surface of the synthetic polymer film has a structure including a plurality of raised portions or a structure including a plurality of recessed portions. In this case, it is estimated that the plurality of raised portions or the plurality of recessed portions only need to have a two-dimensional size in the range of not less than 0.5 µm and not more than 3 µm. The two-dimensional size of the plurality of raised portions or the plurality of recessed portions may be in the range of not less than 0.5 µm and less than 1 µm. As seen from the results of Examples 1 to 5, the depth of the plurality of recessed portions or the height of the plurality of raised portions is, for example, not less than 0.06 µm and not more than 0.5 µm, or may be not less than 0.06 µm and not more than 0.2 µm.

The aspect ratio of the height of the plurality of raised portions (or the depth of the plurality of recessed portions) with respect to the two-dimensional size of the plurality of raised portions (or recessed portions) is, for example, not less than 0.1 and not more than 0.5.

The synthetic polymer films of the sample films of Examples 1 to 5 have at the surface a plurality of raised or recessed portions whose two-dimensional size is not less than 0.5 µm and not more than 3 µm and therefore, advantageously, have excellent transferability. The mold samples of Examples 2 to 5 can be obtained only by forming crystal grains of a desired size (for example, the average grain diameter is not less than 0.5 µm and not more than 3 µm). That is, it is not necessary to perform anodization as in manufacture of a moth-eye mold. Thus, the mold samples of Examples 2 to 5 can be manufactured at a low cost. The plurality of raised or recessed portions may be arranged randomly. When the mold samples of Examples are used, a plurality of raised or recessed portions arranged randomly can be formed at a low cost.

It is preferred that the surface of a synthetic polymer film of an embodiment of the present invention does not have a flat portion between adjoining raised or recessed portions. Alternatively, when a flat portion is provided between adjoining raised or recessed portions, the two-dimensional size (area equivalent circle diameter) of the flat portion viewed in a normal direction of the synthetic polymer film may be smaller than the two-dimensional size of the raised or recessed portions. For example, when the mold samples of Examples 1 to 4 are used, a synthetic polymer film can be produced at a low cost whose surface has an uneven structure that does not have a flat portion between adjoining raised or recessed portions.

WO 2017/090661, WO 201.7/168893 and Japanese Laid-Open Patent Publication No. 2017-48132 disclose a fungal proliferation suppressing member (antifungal member) which has a plurality of raised or recessed portions at the surface and accordingly has antifungal ability. WO 2017/090661 discloses a fungal proliferation suppressing member which has a plurality of protrusions at the surface, wherein the width of the protrusions (the maximum value on the contour of the protrusions when seen in plan view) is not less than 1 µm and not more than 20 µm. WO 2017/168893 discloses a fungal proliferation suppressing member which has a plurality of recessed portions at the surface, wherein the diameter of the opening of the recessed portions is not less than 1 µm and not more than 100 µm. Japanese Laid-Open Patent Publication No. 2017-48132 discloses an antifungal member which has a plurality of linear raised portions extending in one direction at the surface, wherein the average distance between the linear raised portions is not less than 5 µm and not more than 100 µm. In each of the fungal proliferation suppressing members (antifungal members) of WO 2017/090661, WO 2017/168893 and Japanese Laid-Open Patent Publication No. 2017-48132, the two-dimensional size of the plurality of raised or recessed portions at the surface is not less than 1 µm. The surface of the fungal proliferation suppressing members of WO 2017/090661 and WO 2017/168893 has a flat portion between the plurality of raised portions or between the plurality of recessed portions.

The two-dimensional size of the plurality of raised or recessed portions at the surface of a synthetic polymer film of an embodiment of the present invention may be not less than 0.5 µm and less than 1 µm. In this case, the surface of the synthetic polymer film of an embodiment of the present invention is excellent in wettability for water as compared with the fungal proliferation suppressing members (antifungal members) of WO 2017/090661, WO 2017/168893 and Japanese Laid-Open Patent Publication No. 2017-48132.

A synthetic polymer film of an embodiment of the present invention may not have a flat portion between adjoining raised or recessed portions. In this case, the surface of the synthetic polymer film of an embodiment of the present invention is likely to exhibit a so-called Lotus effect, and is therefore excellent in wettability for water, as compared with the surfaces of the fungal proliferation suppressing members of WO 2017/090661 and WO 2017/168893.

Herein, the UV-curable resin has been described, although a resin which can be cured with visible light can be used. Note that, however, the UV-curable resin is preferred because it can be stored and handled easily.

A synthetic polymer film of an embodiment of the present invention can suppress or prevent occurrence and/or proliferation of fungi which is attributed to water adhered to the surface of the synthetic polymer film.

A synthetic polymer film of an embodiment of the present invention is suitably used in uses in which suppression or prevention of occurrence and/or proliferation of fungi is desired.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2018-028456 filed on Feb. 21, 2018, the entire contents of which are hereby incorporated by reference.

What is claimed is:

1. A synthetic polymer film whose surface has a plurality of raised or recessed portions,
   wherein a two-dimensional size of the plurality of raised or recessed portions is in a range of not less than 0.5 μm and not more than 3 μm when viewed in a normal direction of the synthetic polymer film,
   the synthetic polymer film has a crosslink structure and contains an organic carboxylic acid,
   at the lapse of 5 minutes since placing a 200 μL drop of water on the surface of the synthetic polymer film, a pH of an aqueous solution is less than 4, and an area equivalent circle diameter of the aqueous solution is not less than 20 mm, the aqueous solution containing the water and the organic carboxylic acid extracted from the synthetic polymer film,
   at the lapse of 60 seconds since placing a drop of water on the surface of the synthetic polymer film, a static contact angle of the water drop with respect to the surface is less than 3°, and
   the plurality of raised or recessed portions is formed by directly transferring a shape of an outermost surface of a mold to the synthetic polymer film, the mold has an aluminum layer and the outermost surface of the mold is a surface of the aluminum layer that has a plurality of crystal grains, and the shape of the outermost surface of the mold includes a surface shape of the plurality of crystal grains.

2. The synthetic polymer film of claim 1, wherein the plurality of raised or recessed portions are arranged randomly.

3. The synthetic polymer film of claim 1, wherein the synthetic polymer film does not have a flat portion between adjoining raised or recessed portions of the plurality of raised or recessed portions.

4. The synthetic polymer film of claim 1, wherein when viewed in the normal direction of the synthetic polymer film, the two-dimensional size of the plurality of raised or recessed portions is in a range of not less than 0.5 μm and less than 1 μm.

5. The synthetic polymer film of claim 1, wherein an amount of water required for dissolving 1 g of the organic carboxylic acid is equal to or greater than 1000 mL and less than 10000 mL.

6. The synthetic polymer film of claim 1, wherein the organic carboxylic acid is 2,4,6-trimethylbenzoic acid.

7. The synthetic polymer film of claim 1, wherein the synthetic polymer film is made of a photocurable resin, and the organic carboxylic acid is generated by photodecomposition of a photopolymerization initiator contained in the photocurable resin.

8. The synthetic polymer film of claim 7, wherein the photopolymerization initiator contains bis(2,4,6-trimethylbenzoyl)-phenylphosphine oxide.

9. The synthetic polymer film of claim 8, wherein the photopolymerization initiator further contains diphenyl (2,4,6-trimethylbenzoyl) phosphine oxide.

10. The synthetic polymer film of claim 1, wherein the crosslink structure contains an ethylene oxide unit.

11. A production method of a synthetic polymer film, the synthetic polymer film having a plurality of raised or recessed portions at its surface, a two-dimensional size of the plurality of raised or recessed portions being not less than 0.5 μm and not more than 3 μm when viewed in a normal direction of the surface, the method comprising:
   providing a mold, the mold having a plurality of recessed or raised portions at its surface, a two-dimensional size of the plurality of recessed or raised portions being not less than 0.5 μm and not more than 3 μm when viewed in a normal direction of the surface;
   providing a work; and
   irradiating a photocurable resin applied between the mold and a surface of the work with light, thereby curing the photocurable resin,
   wherein the mold includes an aluminum alloy layer at its surface, the aluminum alloy layer containing aluminum and titanium, or the mold includes a high-purity aluminum layer at its surface, a purity of the high-purity aluminum layer is not less than 99.99 mass %.

12. The method of claim 11, wherein the mold includes the aluminum alloy layer at its surface, and a content of titanium in the aluminum alloy layer is not less than 0.01 mass % and not more than 1 mass %.

13. The method of claim 11, wherein the mold includes the aluminum alloy layer at its surface, and a thickness of the aluminum alloy layer is not less than 1 μm and not more than 6 μm.

14. The method of claim 11, wherein the mold includes the aluminum alloy layer at its surface, and the mold further includes an inorganic underlayer under the aluminum alloy layer.

15. The method of claim 14, wherein a thickness of the aluminum alloy layer is not less than 1 μm and less than 4 μm.

16. The method of claim 11, wherein the mold includes the high-purity aluminum layer at its surface, and a thickness of the high-purity aluminum layer is not less than 1 μm and not more than 6 μm.

17. The method of claim 11, wherein the mold includes the high-purity aluminum layer at its surface, and the mold further includes an inorganic underlayer under the high-purity aluminum layer.

18. The method of claim 17, wherein a thickness of the high-purity aluminum layer is not less than 1 μm and less than 2 μm.

19. The method of claim 14, wherein the inorganic underlayer contains an aluminum-doped zinc oxide.

20. The method of claim 17, wherein the inorganic underlayer contains an aluminum-doped zinc oxide.

* * * * *